US012783746B2

(12) United States Patent
Luleci et al.

(10) Patent No.: US 12,783,746 B2
(45) Date of Patent: Nov. 3, 2026

(54) IMMERSIVE VISUALIZATION FOR CONDITION ASSESSMENT OF CIVIL STRUCTURES

(71) Applicant: University of Central Florida Research Foundation, Inc., Orlando, FL (US)

(72) Inventors: Furkan Luleci, Orlando, FL (US); F. Necati Catbas, Orlando, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 874 days.

(21) Appl. No.: 18/300,072

(22) Filed: Apr. 13, 2023

(65) Prior Publication Data

US 2023/0409770 A1 Dec. 21, 2023

Related U.S. Application Data

(60) Provisional application No. 63/351,615, filed on Jun. 13, 2022.

(51) Int. Cl.

| | |
|---|---|
| ***G06F 30/13*** | (2020.01) |
| ***G01S 13/89*** | (2006.01) |
| ***G01S 17/89*** | (2020.01) |
| ***G06F 3/01*** | (2006.01) |

(Continued)

(52) U.S. Cl.

CPC .............. *G06F 30/13* (2020.01); *G01S 13/89* (2013.01); *G01S 17/89* (2013.01); *G06F 3/016* (2013.01); *G06T 17/00* (2013.01); *G06T 19/20* (2013.01); *G06F 2111/02* (2020.01)

(58) Field of Classification Search

None

See application file for complete search history.

(56) References Cited

U.S. PATENT DOCUMENTS

| | | | | |
|---|---|---|---|---|
| 10,007,992 | B1 * | 6/2018 | Harvey | G06F 18/24 |
| 11,446,815 | B2 * | 9/2022 | Shah | B25J 9/1694 |

(Continued)

FOREIGN PATENT DOCUMENTS

| | | | | |
|---|---|---|---|---|
| WO | WO-2018156506 A1 * | 8/2018 | | G06V 20/176 |

OTHER PUBLICATIONS

Yang Wang "Application of Virtual Reality Technique in the Construction of Modular Teaching Resources" 2020 vol. 15, No. 10. pp. 126-139.

(Continued)

*Primary Examiner* — Paul S Schwarzenberg

(74) *Attorney, Agent, or Firm* — Molly L. Sauter; Trenam Law

(57) ABSTRACT

Described herein relates to a system and method for assessing a condition of at least one civil structure utilizing at least one visualization platform (e.g., a Virtual Reality platform and/or an Augmented Reality platform). Additionally, in embodiments, sensorial data of the at least one civil structure may be fused within the at least one visualization platform, such that at least one spatial model based on the recorded sensorial data of the at least one civil structure may be generated. In these embodiments, at least one user may then be able to engage and/or interact with the at least one spatial model. As such, the system may be able to bring the specialized results of the at least one analyzed civil structure to at least one user on the at least one visualization platform, such that the assessment of the at least one civil structure may be optimized.

20 Claims, 21 Drawing Sheets

Condition Assessment of Civil Structures using Immersive Visualization

(51) Int. Cl.

| | |
|---|---|
| ***G06T 17/00*** | (2006.01) |
| ***G06T 19/20*** | (2011.01) |
| *G06F 111/02* | (2020.01) |

(56) References Cited

U.S. PATENT DOCUMENTS

2016/0284127 A1* 9/2016 Rakshit ............ H04N 21/25866
2017/0076438 A1* 3/2017 Kottenstette ........ G06F 18/2413
2018/0247416 A1* 8/2018 Ruda ..................... G06F 18/214

OTHER PUBLICATIONS

Muhammad Omer et al. “Use of gaming technology to bring bridge inspection to the office” Structure and Infrastructure Engineering. May 2019, pp. 1293-1307. vol. 15, No. 10.
Muhammad Omer et al. “Performance evaluation of bridges using virtual reality” Paper presented at 6th European Conference on Computational Mechanics (ECCM 6) 7th European Conference on Computational Fluid Dynamics (ECFD 7), Glasgow, United Kingdom. 2018, pp. 1-12.
Muhammad Omer et al. “Inspection of Concrete Bridge Structures: Case Study Comparing Conventional Techniques with a Virtual Reality Approach” Journal of Bridge Engineering. 2021. 26(10).
J. Fogarty et al. “Exploring Structural Behavior and Component Detailing in Virtual Reality” Structures Congress. 2015, pp. 2557-2564.
Ali Khaloo et al. “ Utilizing UAV and 3D Computer Vision for Visual Inspection of a Large Gravity Dam” Front. Built Environ. Jul. 2018. Pages 1-16 vol. 4 Article 31.

* cited by examiner

B) SHM system installed bridge

IMMERSIVE VISUALIZATION FOR CONDITION ASSESSMENT OF CIVIL STRUCTURES

CROSS-REFERENCE TO RELATED APPLICATIONS

This nonprovisional application claims the benefit of U.S. Provisional Application No. 63/351,615 entitled "IMMERSIVE VISUALIZATION FOR CONDITION ASSESSMENT OF CIVIL STRUCTURES" filed Jun. 13, 2022 by the same inventors, all of which is incorporated herein by reference, in its entirety, for all purposes.

FEDERALLY SPONSORED RESEARCH OR DEVELOPMENT

This invention was made with Government support under Award No. 80NSSC20K0326 awarded by the National Aeronautics and Space Administration (hereinafter "NASA"). The government has certain rights in the invention.

BACKGROUND OF THE INVENTION

1. Field of the Invention

This invention relates, generally, to condition assessment of civil engineering structures. More specifically, it relates to a system and method for assessing a condition of a structure utilizing at least one visualization platform.

2. Brief Description of the Prior Art

In the condition assessment of civil engineering structures, the decision-making phase is a very critical component for optimal asset management requiring a good interpretation of data analysis and evaluation of the collected data. Inspectors and the Structural Health Monitoring (hereinafter "SHM") experts collaborate based on the inspection reports and SHM data analysis from the civil structure to give an end-decision about the life cycle of the asset. During the assessment process, SHM and inspectors hold on-site meetings to elaborate on the SHM and inspection procedure in more detail.

Being at the structure assists in this collaborative work to facilitate the decision-making since inspectors and SHM experts have to visually observe the bridge in situ for better comprehension of the structure's dynamics. However, on-site meetings can be timely (e.g., might take a day to visit a structure based on the travelling distance), costly (e.g., transportation can be expensive), and/or risky (e.g., work zone safety issues due to construction activities, traffic flow or elevated zones).

There are very few Augmented Reality (hereinafter "AR") and/or Virtual Reality (hereinafter "VR") based studies with the same level of analysis and integration for decision making. More importantly, there is currently no available specialized algorithms and data analysis methods used for integrating structural dynamic analysis, load rating, Non-Destructive Evaluation (hereinafter "NDE") and other structural damage detection techniques with AR and VR technologies for condition assessment of civil structures known in the art, which is important for decision making. As such, the current state of practice for condition assessment focuses on visual inspections for condition assessment.

During the condition assessment, for instance, of a bridge structure, the bridge and SHM experts work together for decision making about the life cycle of the structure based on the evaluation of the analyzed data. Due to the nature of the process, they hold on-site meetings in which they visit the field multiple times throughout the process. The invention aims to complement the current practice by bringing experts together seamlessly with all the relevant data and results in a VR and/or AR environment. This will minimize site visits, reduce related costs and create a collaborative environment to improve decision making process for condition assessment of civil structures. At the end, the structure will be brought to experts in the VR and/or AR environment for critical analysis and evaluation of the structures' data, which enhances the efficiency of decision-making process.

Furthermore, utilization of VR and AR technologies for decision-making during the condition assessment of civil structures has not been observed in the literature. Currently known analysis apparatuses are only focused on inspection methods that only consider visual-based defects (e.g., images, videos); however, the analysis of collected data from civil structures also uses SHM sensorial systems and consequently employment of structural analysis methods on the collected data holds crucial importance for condition assessment. Thus, this invention employs visual inspection and SHM sensing methods and integrates them in a VR and/AR environment. Furthermore, this invention provides all the necessary technical information in a single platform (AR or VR platform could be used depending on the availability of the head-mounted display (hereinafter "HMD") device type) to the experts to support them in the decision-making process during the condition assessment of structures.

Accordingly, what is needed is a streamlined, integrated, and interactive condition assessment framework, such that site visits are minimized or eliminated, and related costs are reduced by bringing the experts from different locations online in the same collaborative platform for condition assessment of structures. However, in view of the art considered as a whole at the time the present invention was made, it was not obvious to those of ordinary skill in the field of this invention how the shortcomings of the prior art could be overcome.

SUMMARY OF THE INVENTION

The long-standing but heretofore unfulfilled need, stated above, is now met by a novel and non-obvious invention disclosed and claimed herein. In an aspect, the present disclosure pertains to a method of contactless structural analysis on at least one visualization platform associated with a computing device. In an embodiment, the method may comprise the steps of: (a) receiving, via at least one user interface associated with the at least one visual platform, a data query from at least one user regarding at least one civil structure; (b) transmitting, via at least one processor of the computing device communicatively coupled to at least one sensor in mechanical communication with the at least one civil structure, at least one sensorial input to the at least one visualization platform, the at least one sensorial input being configured to be displayed on the at least one visualization platform; (c) generating, via the at least one visualization platform, at least one spatial model of the at least one civil structure based on the at least one received sensorial input; and (d) automatically displaying the at least one generated spatial model on the at least one visualization platform associated with the computing device by: (i) based on a determination that at least one tactile-input is received from the at least one user, via the at least one user-interface, generating at least one spatial alteration to the at least one generated spatial model; and (ii) based on a determination that at least one tactile-input is not received from the at least one user, via the at least one user-interface, maintaining the at least one generated spatial model. In this embodiment, the at least one sensor may include but is not limited to an accelerometer, a strain gauge, a potentiometer, a camera, LiDAR scanner, an NDT tool, an ultrasound system, an infrared camera, and/or Ground Penetrating Radar (GPR).

In some embodiments, the at least one visualization platform associated with the computing device may comprise a multiplayer network, allowing the at least one user and/or at least one alternative user to engage with the at least one generated spatial model simultaneously. In these other embodiments, due to the multiplayer network the at least one user and/or at least one alternative user may engage with the at least one generated spatial model with at least one user interface disposed in at least one remote location with respect to the at least one visualization platform. As such, the at least one user interface may be communicatively coupled with the at least one visualization platform.

In some embodiments, the method may further comprise the step of, recording, via the at least one processor of the computing device, the at least one sensorial input to a memory of the computing device. Moreover, the method may then further comprise the step of, after recording the at least one sensorial input, assigning, via the at least one processor, a unique profile to the at least one recorded sensorial input, the at least one generated spatial model, or both associated with the at least one civil structure.

In these other embodiments, the method may also comprise the step of, after assigning the at least one unique profile, recording at least one sensorial input from at least one alternative civil structure to the memory of the computing device. In this manner, the method may then comprise the step of, after recording the at least one sensorial input of the at least one alternative civil structure, assigning, via the at least one processor, an alternative unique profile to the at least one recorded sensorial input and/or the at least one generated spatial model associated with the at least one alternative civil structure.

As such, in these other embodiments, the method may also comprise the step of, receiving, via the at least one user-interface, a spatial model query regarding the at least one unique profile and/or the at least one alternative unique profile from the at least one user and/or the at least one alternative user, such that upon receiving the spatial model query, the at least one processor may be configured to automatically display the at least one spatial model and/or the at least one alternative spatial model, or both on the at least one visualization platform associated with the computing device.

In some embodiments, the method may further comprise the step of, after generating the at least one spatial model, overlaying, via the at least one processor, the at least one sensorial input onto the at least one generated spatial model. In these other embodiments, the method may also further comprise the step of, selecting, via the at least one user-interface, at least one portion of the at least one generated model, such that upon receiving the selection, the at least one processor may be configured to automatically display the at least one overlayed sensorial input associated with the selected portion of the at least one generated model on the at least one visualization platform associated with the computing device. Accordingly, the method may then comprise the step of, after overlaying the at least one sensorial input onto the at least one generated spatial model, displaying the at least one generated spatial model within a background scene comprising the at least one civil structure's real environment.

Moreover, an additional aspect of the present disclosure pertains to a structural analysis optimization system for automatically displaying a spatial model of at least one civil structure on at least one visualization platform associated with a computing device. In an embodiment, the structure analysis optimization system may comprise: (a) the computing device comprising at least one processor; and (b) a non-transitory computer-readable medium operably coupled to the at least one processor, the computer-readable medium having computer-readable instructions stored thereon that, when executed by the at least one processor, cause the structural analysis optimization system to automatically display at least one spatial model of the at least one civil structure on the at least one visualization platform associated with the computing device by executing instructions comprising: (i) receiving, via at least one user interface associated with the at least one visual platform, a data query from at least one user regarding at least one civil structure; (ii) transmitting, via at least one processor of the computing device communicatively coupled to at least one sensor in mechanical communication with the at least one civil structure, at least one sensorial input to the at least one visualization platform, the at least one sensorial input being configured to be displayed on the at least one visualization platform; (iii) generating, via the at least one visualization platform, at least one spatial model of the at least one civil structure based on the at least one received sensorial input; and (iv) automatically displaying the at least one generated spatial model on the at least one visualization platform associated with the computing device by: (A) based on a determination that at least one tactile-input is received from the at least one user, via the at least one user-interface, generating at least one spatial alteration to the at least one generated spatial model; and (B) based on a determination that at least one tactile-input is not received from the at least one user, via the at least one user-interface, maintaining the at least one generated spatial model. In this embodiment, the at least one sensor may include but is not limited to an accelerometer, a strain gauge, a potentiometer, a camera, LiDAR scanner, an NDT tool, an ultrasound system, an infrared camera, and/or Ground Penetrating Radar (GPR).

In some embodiments, the at least one visualization platform associated with the computing device may comprise a multiplayer network, allowing the at least one user and/or at least one alternative user to engage with the at least one generated spatial model simultaneously. In these other embodiments, due to the multiplayer network the at least one user and/or at least one alternative user may engage with the at least one generated spatial model with at least one user interface disposed in at least one remote location with respect to the at least one visualization platform. As such, the at least one user interface may be communicatively coupled with the at least one visualization platform.

In some embodiments, the executed instructions may further comprise the step of recording, via the at least one processor of the computing device, the at least one sensorial input to a memory of the computing device. As such, the executed instructions may also comprise the step of, after recording the at least one sensorial input, assigning, via the at least one processor, a unique profile to the at least one recorded sensorial input and/or the at least one generated spatial model associated with the at least one civil structure.

In these other embodiments, the executed instructions may then comprise the step of, after assigning the at least one unique profile, recording at least one sensorial input from at least one alternative civil structure to the memory of the computing device.

Additionally, in these other embodiments, the executed instructions may further comprise the step of, after recording the at least one sensorial input of the at least one alternative civil structure, assigning, via the at least one processor, an alternative unique profile to the at least one recorded sensorial input and/or the at least one generated spatial model associated with the at least one alternative civil structure. In this manner, the executed instructions may comprise the step of, receiving, via the at least one user-interface, a spatial model query regarding the at least one unique profile and/or the at least one alternative unique profile from the at least one user and/or the at least one alternative user, such that upon receiving the spatial model query, the at least one processor may be configured to automatically display the at least one spatial model and/or the at least one alternative spatial model on the at least one visualization platform associated with the computing device.

Furthermore, an additional aspect of the present disclosure pertains to a method of contactless structural analysis on at least one visualization platform associated with a computing device. In an embodiment, the method may comprise the steps of: (a) receiving, via at least one user interface associated with the at least one visual platform, a data query from at least one user regarding at least one civil structure; (b) transmitting, via at least one processor of the computing device communicatively coupled to at least one sensor in mechanical communication with the at least one civil structure, at least one sensorial input to the at least one visualization platform, the at least one sensorial input being configured to be displayed on the at least one visualization platform; (c) generating, via the at least one visualization platform, at least one spatial model of the at least one civil structure based on the at least one received sensorial input; (d) overlaying, via the at least one processor, the at least one sensorial input onto the at least one generated spatial model; (e) creating, via the at least one visualization platform, a background scene comprising the at least one civil structure's real environment based on the at least one overlayed sensorial input; and (f) automatically displaying the at least one generated spatial model within the background scene on the at least one visualization platform associated with the computing device by: (i) based on a determination that at least one tactile-input is received from the at least one user, via the at least one user-interface, generating at least one spatial alteration to the at least one generated spatial model; and (ii) based on a determination that at least one tactile-input is not received from the at least one user, via the at least one user-interface, maintaining the at least one generated spatial model.

By utilizing the present disclosure, the at least one analyzed civil structure may be brought to the at least one user without having to physically visit the site of the structure. For example, while the at least one user may be in their office literally anywhere in the world, the at least one user may also be to collaborate safely and/or efficiently in at least one visualization platform by connecting to the head-mounted display (hereinafter "HMD") and/or the at least one user interface associated with the at least one visualization platform. Accordingly, the advantage of using the present disclosure may be to minimize and/or eliminate the site visits for condition assessment of the at least one civil structure, which in turn integrates all data, results and/pr models in the at least one visualization platform, cutting down on-site visits, reducing costs and/or work zone safety issues due to construction activities, or traffic flow interruptions.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not restrictive.

The invention accordingly comprises the features of construction, a combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, which.

DETAILED DESCRIPTION OF THE INVENTION

Figure 1:
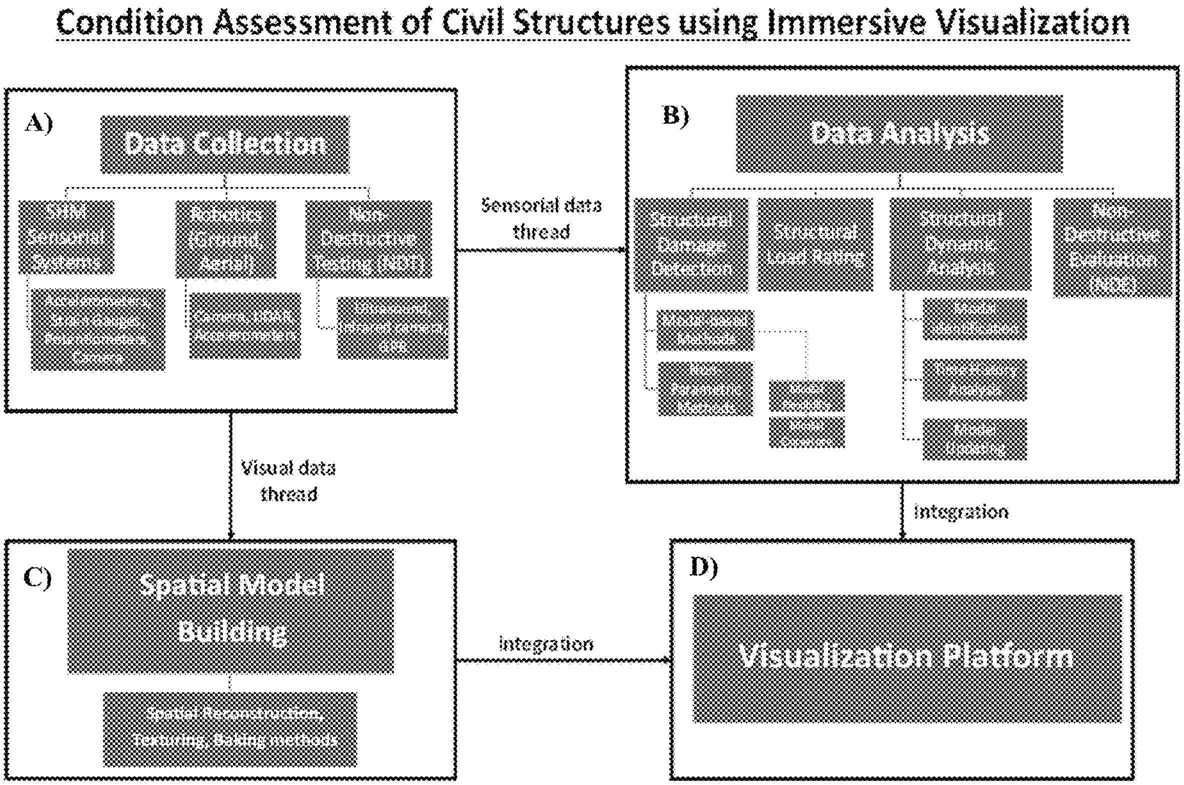
FIG. 1 is a structure analysis visualization system workflow (e.g., framework) for at least one civil structure utilizing at least one visualization platform, according to an embodiment of the present disclosure.

In the following detailed description of the preferred embodiments, reference is made to the accompanying drawings, which form a part thereof, and within which are shown by way of illustration specific embodiments by which the invention may be practiced. It is to be understood that one skilled in the art will recognize that other embodiments may be utilized, and it will be apparent to one skilled in the art that structural changes may be made without departing from the scope of the invention. Elements/components shown in diagrams are illustrative of exemplary embodiments of the disclosure and are meant to avoid obscuring the disclosure. Any headings, used herein, are for organizational purposes only and shall not be used to limit the scope of the description or the claims. Furthermore, the use of certain terms in various places in the specification, described herein, are for illustration and should not be construed as limiting.

Reference in the specification to "one embodiment," "preferred embodiment," "an embodiment," or "embodiments" means that a particular feature, structure, characteristic, or function described in connection with the embodiment is included in at least one embodiment of the disclosure and may be in more than one embodiment. The appearances of the phrases "in one embodiment," "in an embodiment," "in embodiments," "in alternative embodiments," "in an alternative embodiment," or "in some embodiments" in various places in the specification are not necessarily all referring to the same embodiment or embodiments. The terms "include," "including," "comprise," and "comprising" shall be understood to be open terms and any lists that follow are examples and not meant to be limited to the listed items.

Definitions

As used in this specification and the appended claims, the singular forms "a," "an," and "the" include plural referents unless the content clearly dictates otherwise. As used in this specification and the appended claims, the term "or" is generally employed in its sense including "and/or" unless the context clearly dictates otherwise.

In the following description, for the purposes of explanation, numerous specific details are set forth in order to provide a thorough understanding of embodiments of the present technology. It will be apparent, however, to one skilled in the art that embodiments of the present technology may be practiced without some of these specific details. The techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to program a computer (or other electronic devices) to perform a process.

The machine readable medium described below may be a machine readable signal medium or a machine readable storage medium. A machine readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the machine readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a machine readable storage medium may be any tangible medium that can contain or store a program for use by or in connection with an instruction execution system, apparatus, or device.

A machine readable signal medium may include a propagated data signal with machine readable program PIN embodied therein, for example, in baseband or as part of a carrier wave. Such a propagated signal may take any of a variety of forms, including, but not limited to, electro-magnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program PIN embodied on a machine readable medium may be transmitted using any appropriate medium, including but not limited to wireless, wire-line, optical fiber cable, radio frequency, etc., or any suitable combination of the foregoing. Computer program PIN for carrying out operations for aspects of the present invention may be written in any combination of one or more programming languages, including an object oriented programming language such as Java, C#, C++, Python, MATLAB, or the like and conventional procedural programming languages, such as the "C" programming language or similar programming languages.

Aspects of the present invention are described below with reference to flowchart P illustrations and/or block diagrams of methods, apparatus (e.g., systems) and computer program products according to embodiments of the invention. It will be understood that each block of the flowchart illustrations and/or block diagrams, and combinations of blocks in the flowchart illustrations and/or block diagrams, can be implemented by computing device program instructions. These computing device program instructions may be provided to a processor of a general purpose computer, special purpose computer, or other programmable data processing apparatus to produce a machine, such that the instructions, which execute via the processor of the computing device or other programmable data processing apparatus, create means for implementing the functions/acts specified in the flowchart and/or block diagram block or blocks.

These computing device program instructions may also be stored in a machine readable medium that can direct a computer, other programmable data processing apparatus, or other devices to function in a particular manner, such that the instructions stored in the machine readable medium produce an article of manufacture including instructions which implement the function/act specified in the flowchart and/or block diagram block or blocks.

The computing device program instructions may also be loaded onto a computer, other programmable data processing apparatus, or other devices to cause a series of operational steps to be performed on the computer, other programmable apparatus, or other devices to produce a computing device implemented process such that the instructions which execute on the computing device or other programmable apparatus provide processes for implementing the functions/acts specified in the flowchart and/or block diagram block or blocks.

The time window for data collection of a structure may be extended over an extended period of time, such as from about a month or shorter up to about three years or longer. For example, the administration regimen can be extended over a range and/or a period of any of about 2, 3, 4, 5, 6, 7, 8, 9, 10, 11, 12, 18, 24, 30, 36, 50, 72 seconds, minutes, days, weeks, months, years, encompassing every integer in between, and/or any time known in the art for effectively collecting structural integrity and maintenance data of a structure. In some embodiments, there is no break in the data collection schedule.

As used herein, "about" means approximately or nearly and in the context of a numerical value or range set forth means±15% of the numerical.

As used herein, the term "visualization platform" may refer to any display device and/or graphical user interface known in the art configured to superimpose and/or generate a three-dimensional (hereinafter "3D") image and/or environment in a physical manner. The visualization platform may be virtual reality (hereinafter 'VR"), augmented reality (hereinafter "AR"), mixed reality (hereinafter "MR"), extended reality (hereinafter "XR"), non-immersive VR, semi-immersive VR, and/or fully-immersive VR. For ease of reference, the exemplary embodiment described herein refers to VR and/or AR, but this description should not be interpreted as exclusionary of other display devices and/or graphical user interfaces.

As used herein, the term "communicatively coupled" may refer to any coupling mechanism known in the art, such that at least one electrical signal may be transmitted between one device and one alternative device. Communicatively coupled may refer to Wi-Fi, Bluetooth, wired connections, wireless connection, and/or magnets. For ease of reference, the exemplary embodiment described herein refers to Wi-Fi and/or Bluetooth, but this description should not be interpreted as exclusionary of other electrical coupling mechanisms.

As used herein, the term "sensor" and/or "sensorial system" may refer to any device known in the art configured to collect and/or measure at least one physical parameter of any structure and/or civil structure known in the art. The sensor and/or sensorial system may include but are not limited to accelerometers, strain gauges, potentiometers, cameras, and/or Robotics such as Ground, Aerial robots which may be equipped with a camera, LiDAR, accelerometers, and/or NDT tools, such as ultrasound system, infrared camera, Ground Penetrating Radar (GPR).

As used herein, the term "spatial model" may refer to any model known in the art configured to receive a tactile-input, such that the model may adjust any physical characteristic known in the art (e.g., shape, size, and/or angle) in response to the tactile-input. The model may be a two-dimensional (hereinafter "2D") model, a data graph, a data plot, a data table, and/or a 3D model. For ease of reference, the exemplary embodiment described herein refers to a 3D model, but this description should not be interpreted as exclusionary of other data-based models.

All numerical designations, including ranges, are approximations which are varied up or down by increments of 1.0, 0.1, 0.01 or 0.001 as appropriate. It is to be understood, even if it is not always explicitly stated, that all numerical designations are preceded by the term "about". It is also to be understood, even if it is not always explicitly stated, that the compounds and structures described herein are merely exemplary and that equivalents of such are known in the art and can be substituted for the compounds and structures explicitly stated herein.

Wherever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Wherever the term "no more than," "less than," or "less than or equal to" precedes the first numerical value in a series of two or more numerical values, the term "no more than," "less than" or "less than or equal to" applies to each of the numerical values in that series of numerical values. For example, less than or equal to 1, 2, or 3 is equivalent to less than or equal to 1, less than or equal to 2, or less than or equal to 3.

Structure Analysis Visualization System

The present disclosure pertains to a system and method for assessing the condition of a structure using at least one visualization platform (e.g., a Virtual Reality (hereinafter "VR") and/or Augmented Reality (hereinafter "AR") platforms. In an embodiment, the structural analysis visualization system may comprise a computing device having at least one processor. As such, in this embodiment, the computing device may be configured to be communicatively coupled (e.g., in electrical communication) with at least one visualization platform, application, display device, and/or graphical user interface, such that the computing device may be configured to assist at least one user examining at least one civil structure with a decision-making process.

In an embodiment, the structural analysis visualization system may be configured to provide technical data to the at least one user, as well as results from at least one specialized algorithm of structural health monitoring (hereinafter "SHM"), integrated within the at least one processor, about the in the at least one visualization platform. In this manner, the computing device may be configured to enable the at least one visualization platform to be collaborative and/or immersive, (e.g., the HMD associated with the at least one visualization platform). As such, in this embodiment, the at least one user may interact and/or engage with at least one spatial model (e.g., a tactile-spatial model, 2D model, and/or a 3D model) generated by the at least one computing device (e.g., rotate the at least one spatial model, increase size of the at least one spatial model, and/or input a force on the at least one spatial model) within the at least one visualization platform. Accordingly, the structure analysis visualization system may be configured to enable a more enhanced and/or effective interpretation of the assessment results by the experts conducting the SHM of the at least one civil structure.

In addition, in an embodiment, the structure analysis visualization system may also be configured to provide structural damage detection results based on structural modal flexibility and/or curvature using at least one sensorial input (e.g., the sensorial data collected), via at least one sensor in mechanical communication with the at least one civil structure. In this manner, the at least one sensor may be in electrical communication with the computing device. As such, the at least one sensorial input may include but not is not limited to structural load rating methods, structural dynamic analysis, and/or Non-Destructive Evaluation results of the at least one civil structure. In this embodiment, once the at least one sensor collects the at least one sensorial input, the at least one processor of the computing device may be configured to transmit and/or record the at least one sensorial input within a memory of the computing device. Accordingly, the at least one processor may be configured to integrate the recorded at least one sensorial input with the at least one real captured and/or processed spatial model of the at least one civil structure and/or the at least one processor may then fuse the at least one real captured and/or processed spatial model in the at least one visualization platform (e.g., VR and/or AR).

As such, FIGS. 1A-1D depict a structure analysis visualization system for the at least one civil structure using the at least one visualization platform, according to an embodiment of the present disclosure. In an embodiment, the structure analysis visualization system may comprise multiple components which may be carried out in any order, except the integration of the at least one sensorial input and/or an analysis, via the at least one processor, in addition to the at least one resulting spatial model fused within the at least one visualization platform.

As shown in Section A of FIG. 1, in an embodiment, as stated above the computing device of the structure analysis visualization system may be configured to be in electrical communication with at least one sensorial system, such that the computing device may be configured to collect and/or record the at least one sensorial input (e.g., the sensorial data of the at least one civil structure) of the at least one civil structure within the memory of the computing device. In this manner, the computing device of the structure analysis visualization system may be configured to collect visual data, as shown in Section A of FIG. 1, such that the visual data may be used to capture visual information of the at least one existing civil structure utilizing at least one sensor (e.g., a camera, LiDAR-based sensors), which may be employed by the robots and/or sensorial systems in order to produce the at least one spatial model of the at least one civil structure. Moreover, the at least one sensorial input collected by the at least one sensor and/or sensorial system may also include the vibration, strain, displacement, and/or NDT data collection from the existing structure by using the robotics-based sensors and/or SHM sensorial systems and/or NDT tools to produce useful technical information about the structural condition, as shown in Section A of FIG. 1, in conjunction with FIG. 4. In this manner, as shown in Section C of FIG. 1, in conjunction with FIG. 4, in this embodiment, the visual data received from the data collection component may then be processed, via spatial reconstruction, texturing, and/or baking methods (e.g., 2D reconstruction and/or 3D reconstruction) to produce the at least one spatial model of the real existing civil structure. As such, in this embodiment, the computing device may be configured to integrate the at least one produced spatial model into the at least one visualization platform.

Simultaneously, as shown in Section B of FIG. 1, in an embodiment, the at least one processor of the computing device of the structure analysis visualization system may be configured to process the 1D, 2D, and/or 3D sensorial data received from the at least one sensor and/or sensorial system (i.e., the at least one sensorial input) to analyze a health condition of the at least one civil structure. In this manner, the at least one processor may analyze the health condition by employing at least one structural damage detection algorithm, structural load rating indices, structural dynamic analysis and/or NDE methods. Thereafter, in an embodiment, the outputs from the Data Analysis component, as shown in Section B of FIG. 1, and/or the Spatial Model Building component, as shown in Section C of FIG. 1, may be integrated into the at least one visualization platform. Moreover, as shown in Section D of FIG. 1, the at least one visualization platform may be built as the integration of the at least one spatial model and/or structural data analysis results, which may further be fine-tuned for the specific need of a user. Accordingly, in this embodiment, structure analysis visualization system may be configured to develop the at least one spatial model and/or Data analysis within the at least one visualization platform for any type of structure and/or civil structure known in the art.

Figure 2:
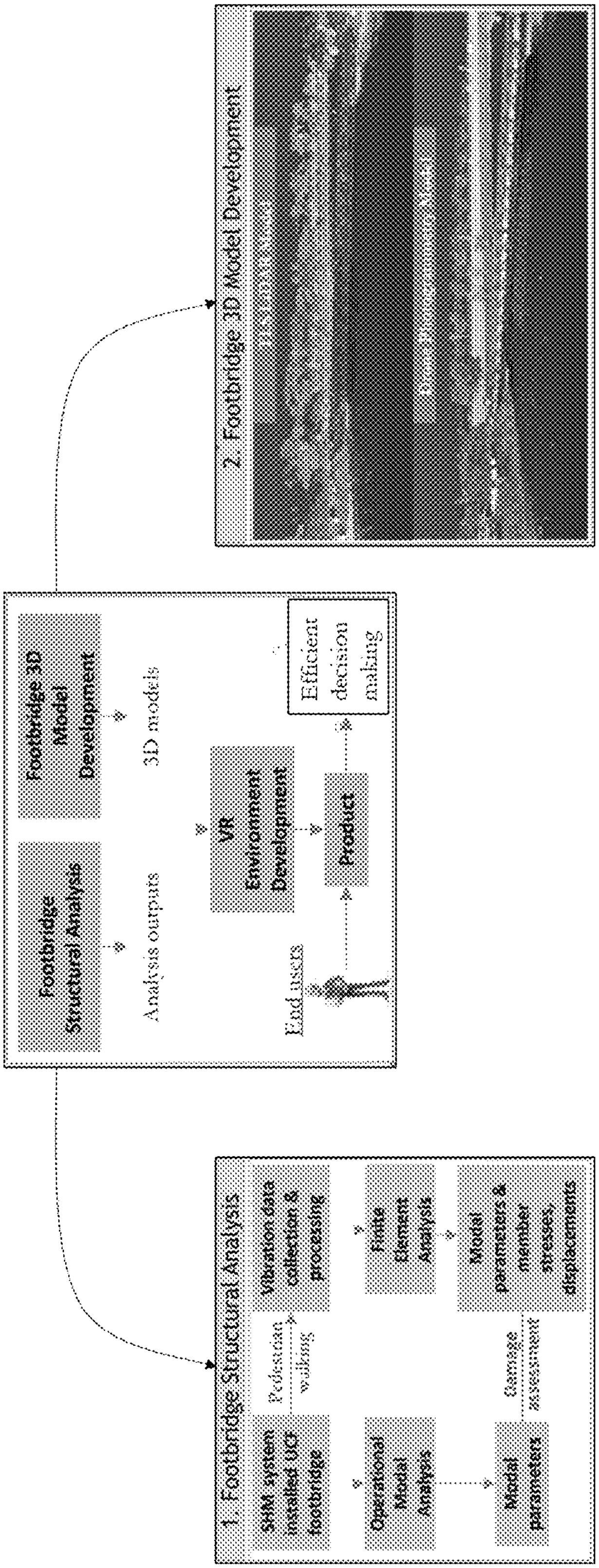
FIG. 2 is an exemplary embodiment of a structure analysis visualization system for at least one civil structure using at least one visualization platform, according to an embodiment of the present disclosure.

As shown in FIG. 2, in an embodiment, the structure analysis visualization system may be configured to implement the at least one spatial model on at least two separate visualization platforms and/or combined visualization platforms, such that two or more users may be configured to interact with the at least one spatial model, simultaneously and/or in real-time. As such, each of the visualization platforms may comprise similar technologies to provide a collaborative workspace for the two or more users during the condition assessment of the at least one civil structure, via the at least one spatial model. Additionally, in this embodiment, the at least one visualization platform may comprise at least two user interfaces. Moreover, based on the type of visualization platform implemented by the structure analysis visualization system, the visualization platform may require at least one user interface and at least one alternative user interface. For example, in some embodiments, Microsoft HoloLens HMD may be used for the AR visualization platform, while an Oculus Quest HMD may be used for the VR visualization platform.

Figure 3A:
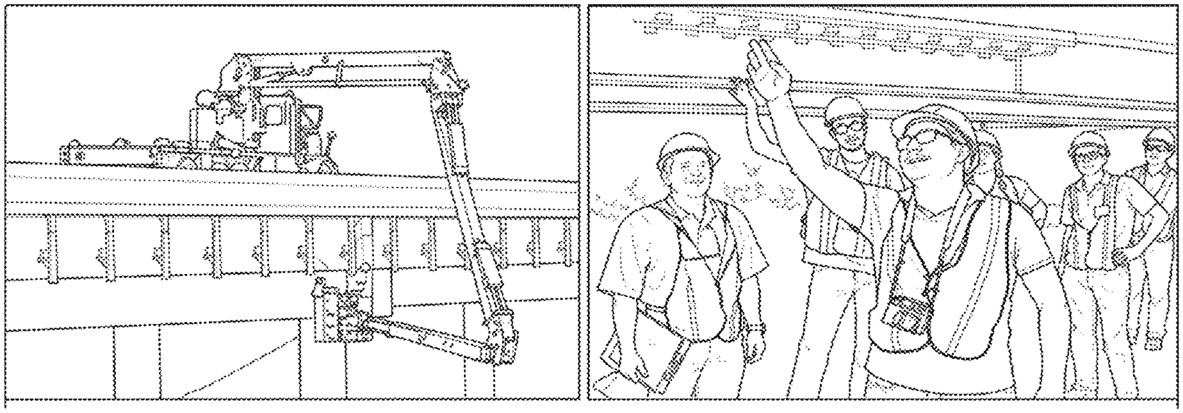
FIG. 3A depicts a human-based condition assessment of a civil structure, according to an embodiment of the present disclosure.
Figure 3B:
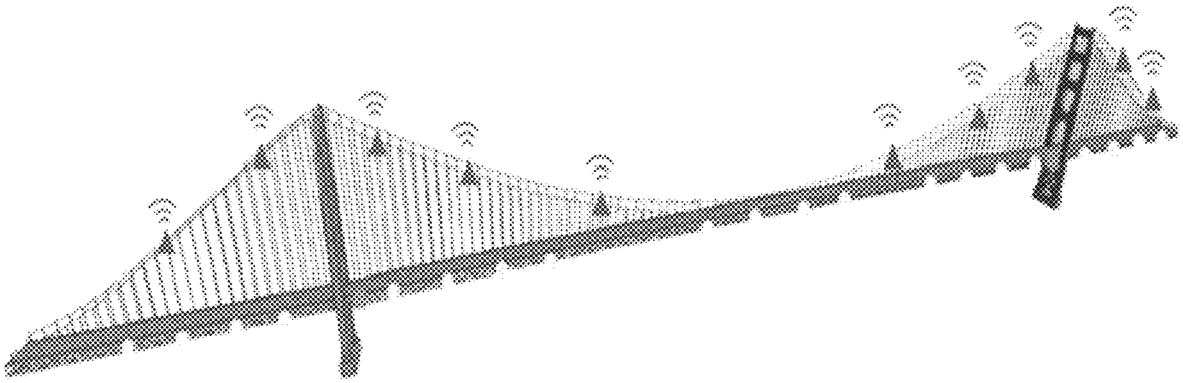
FIG. 3B is a sensorial system installed on a civil structure, according to an embodiment of the present disclosure.

FIGS. 3A-3B depict at least one form of Structural Health Monitoring (hereinafter "SHM") of at least one civil structure, according to an embodiment of the present disclosure. Traditionally, as known in the art, as shown in FIG. 3A, a standard inspection of the at least one civil structure requires a team of experts to inspect all aspects of the bridge in order to detect any potential damage or issues within the structure. As such, as shown in FIG. 3B, in conjunction with FIG. 1, in an embodiment, the sensorial system may be installed on the at least one civil structure, such that the sensorial system may be in mechanical communication with the at least one civil structure in order to provide real-time data to the structure analysis visualization system.

Accordingly, in an embodiment, based on the real-time data provided by the at least one sensor and/or sensorial system, the at least one processor of the structure analysis visualization system may be configured to perform a condition assessment of the at least one civil structure. As such, via the at least one user interface, the at least one user, via the structure analysis visualization system, may detect the SHM sensorial system disposed on the structure. Accordingly, the at least one user interface may comprise a touch-input such that the at least one user may interact with the at least one visualization platform, in real-time. In this embodiment, the structure analysis visualization system may be configured to provide an overlay of the real-time sensorial system data on an image, a video, and/or the at least one spatial model of the at least one civil structure, as shown in FIGS. 4-6H. In this manner, the at least one user may interact with the overlay of the SHM sensorial system presented by the computing device of the structure analysis visualization system, through the at least one user interface of the computing device. As such, in this embodiment, when the at least one user interacts with the overlay of the sensorial system, the structure analysis visualization system may be configured to present the real-time data selected by the at least one user from the at least one sensor disposed on the structure. In this manner, the structure analysis visualization system may provide the at least one user with up-to-date information during an inspection and/or assessment of the at least one civil structure.

Figure 4:
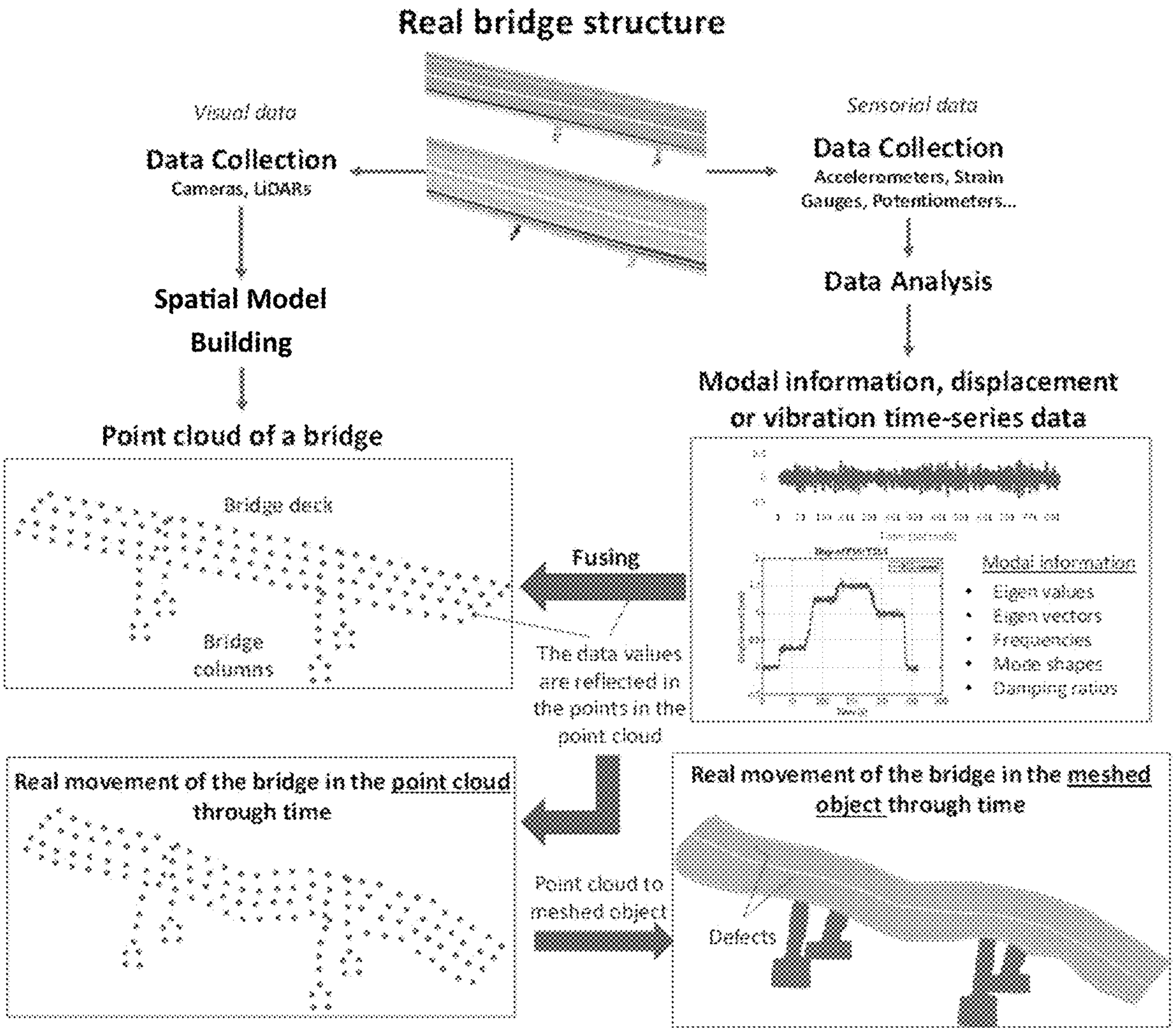
FIG. 4 is a graphical workflow illustrating an exemplary configuration of Spatial Model Building for a structure analysis visualization system, according to an embodiment of the present disclosure.

Moreover, as shown in FIG. 4, in conjunction with FIGS. 1-3B, in an embodiment, the at least one processor of the structure analysis visualization system may be configured to fuse the at least one recorded sensorial input (e.g., modal information, displacement and/or raw vibration time-series data values) into a plurality of individual points within a point cloud. Fusing is executed in a way that after reflecting these data values into the plurality of individual points, each of the plurality of individual points within in the point cloud may be configured to be animated throughout the time of the data values, via the at least one processor of the structure analysis visualization system. In this manner, in this embodiment, in order to create the point cloud of the at least one civil structure, the at least one processor is configured to receive the recorded and/or the present and/or existing structural sensorial data (i.e., the at least one sensorial input) (e.g., the movement and/or behavior of the at least one civil structure based on the data values throughout a predetermined time period (e.g., one hour, one day, one week, and/or one month), in real-time and then the at least one processor is configured to display the at least one sensorial input in the point cloud. For example, as shown in FIG. 4, in some embodiments, the data values (which were collected and then analyzed) may demonstrate the real behavior of the at least one civil structure under being loaded (e.g., vehicle passing etc.).

As such, once the at least one sensorial input is displayed within the point cloud, in an embodiment, the structural visualization system may be configured to convert the point cloud into at least one meshed object (e.g., at least one spatial model) (with the help of colored images of the bridge), such that the texture of the at least one civil structure may be displayed (e.g., concrete surface of a bridge). Accordingly, having the at least one sensorial input within the point cloud, in addition to being able to convert the point cloud into the at least one meshed object (e.g. at least one spatial model) is critical for condition assessment and/or evaluation of the at least one civil structure as the structural visualization system may be configured to display the present and/or existing sensorial data (e.g., a visual condition, movement and/or behavior of the at least one civil structure) in real-time overlayed with the at least one spatial model and/or meshed object (e.g., animated) within the at least one user interface of the structure analysis visualization system. Subsequently, in this embodiment, the animated point cloud and/or the at least one meshed object may be transmitted, via the at least one processor of the structure analysis visualization system, to the at least one visualization platform (e.g., the VR platform, the AR platform, and/or the VR/AR platform) along with at least one Spatial Model Building output, as shown in FIG. 1 and FIG. 4, and/or Data Analysis outputs, as shown in FIG. 1 and FIG. 4, such that the at least one user may interact with the at least one meshed object and/or sensorial data overlay (i.e., the at least one sensorial input). As such, this kind of visualization technique may positively impact the decision-making process of the at least one user, in real-time, during the condition assessment and/or examination of the at least one civil structure.

Figure 5A:
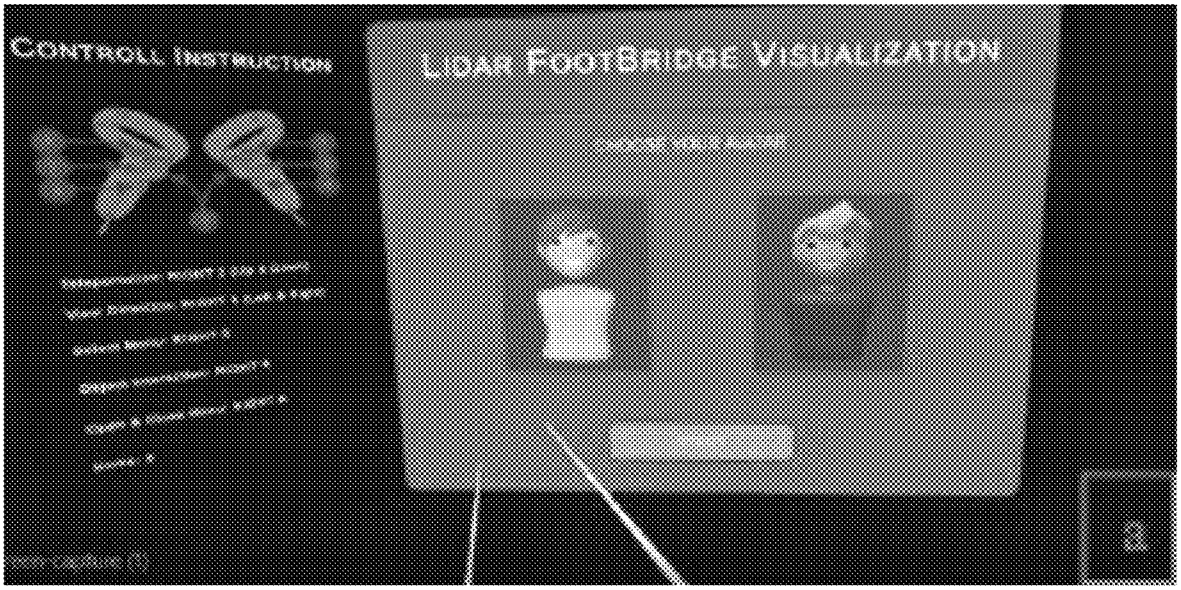
FIG. 5A is an avatar panel of at least one visualization platform, according to an embodiment of the present disclosure.

In addition, as shown in FIGS. 5A-5H, in conjunction with FIG. 1 and FIG. 4, the at least one visualization platform may be configured such that it is easy to navigate, easy to visualize the overlayed sensorial data, and/or organized environment to provide a good quality workplace for the at least one user. In this manner as shown in FIG. 5A, in an embodiment, once the at least one user enters into the first activation scene and/or section, the structure analysis visualization system may be configured to provide at least one a panel within the at least one visualization platform, such that the at least one visualization platform may provide at least one option to the at least one user to choose (e.g., at least one avatar). In this manner, in this embodiment, once the at least one user selected the at least one option, the processor may be configured to activate a waiting room within the at least one visualization platform during a loading process of the at least one spatial model and/or overlay within a collaborative space of the at least one visualization platform. Additionally, in some embodiments, once the at least one user selected the at least one option, the at least one processor may be configured to integrate the at least one selected option within the at least one visualization platform, such that the at least one selected option may encompass the at least one user experience and/or persona (e.g., the avatar) as they are within the at least one visualization platform.

Figure 5B:
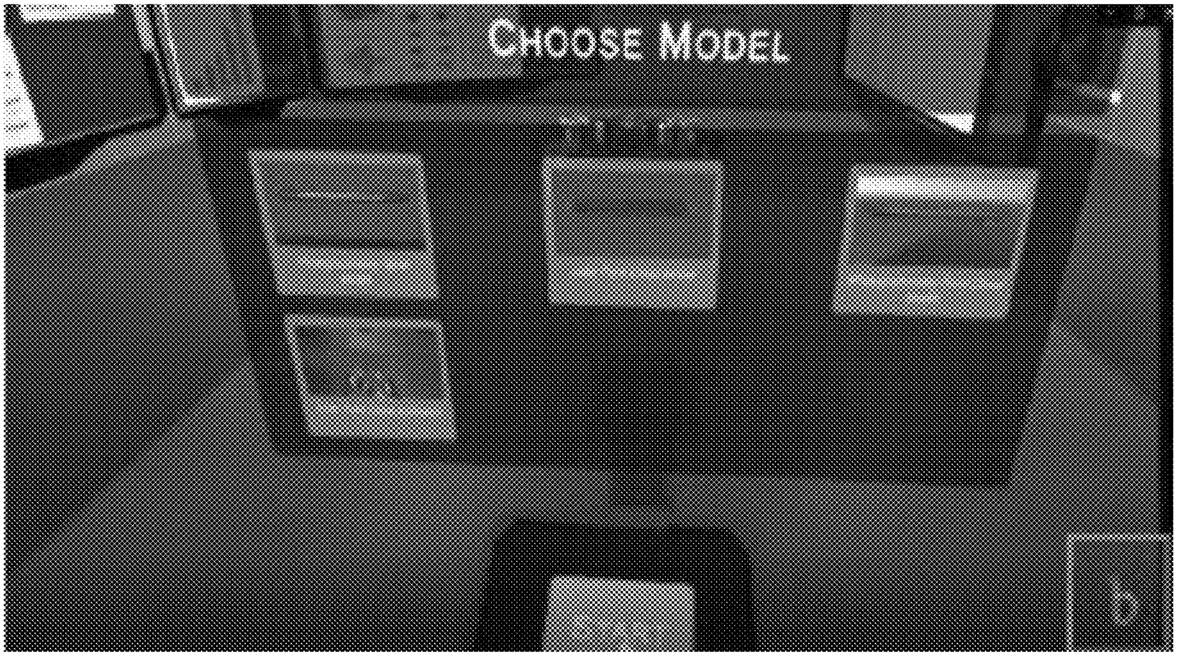
FIG. 5B is a model panel of at least one visualization platform, according to an embodiment of the present disclosure.

Moreover, in an embodiment, the at least one processor of the structure analysis visualization system may be configured to activate the collaborative space within the at least one visualization platform, such that the at least one user may interact with at least one alternative user when engaging with the at least one spatial model and/or overlayed sensorial data of the at least one civil structure. Then, as shown in FIG. 5B, in conjunction with FIG. 1 and FIG. 4, in this embodiment, the at least one visualization platform may further comprise a console within the collaborative space, such that the at least one user may be able to search and/or find the console. As such, the console may be configured to provide a plurality of model options (e.g., real asset captures, spatial model, 2D model, and/or sensorial data overlay) to be chosen. In this manner, in some embodiments, console and/or the plurality of model options may also be viewed and/or selected in the waiting room which encompasses at least one user.

Additionally, in some embodiments, the processor may be configured to replace and/or alternate the at least one selected option of the plurality of model options with at least one alternative model within plurality of model options within the waiting room and/or the collaborative space of the at least one visualization platform, as directed by the at least one user, via auditory, visual, and/or tactile input with the at least one user interface, and/or by at least one algorithm of the structure analysis visualization system. As such, in some embodiments, the at least one user-interface may include, but is not limited to at least one microphone, the HMD associated with the at least one visualization platform, and/or at least one spatial localization sensor. In this manner, in these other embodiments, the HMD may be configured to track an eye movement of the at least one user. Moreover, the at least one spatial localization sensor may be configured to determine a movement by at least one appendage of the at least one user. In this manner, when the at least one user-interface receives at least one input, the at least one processor may be configured to transmit the at least one user-interface input to the at least one visualization platform, such that the movement and/or selection within the at least one visualization platform mimics the at least one user-interface input received by the at least one user.

Figure 5C:
FIG. 5C is a decision-making room of at least one visualization platform, according to an embodiment of the present disclosure.
Figure 5D:
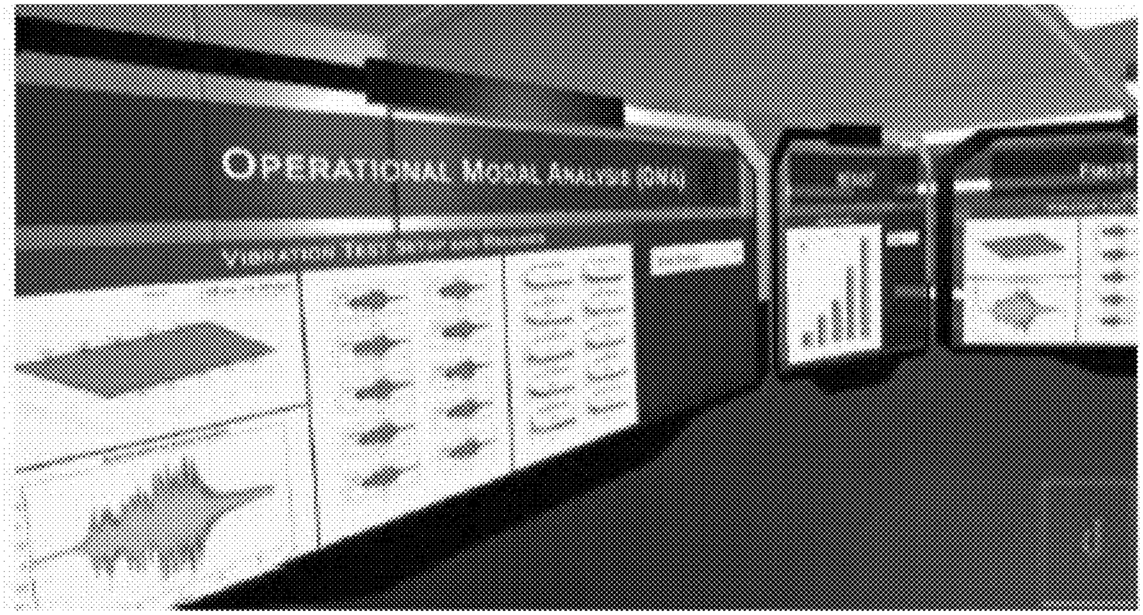
FIG. 5D is an Operational Modal Analysis (hereinafter "OMA"), a Result, and a Finite Element Analysis (hereinafter "FEA") panel of at least one visualization platform, according to an embodiment of the present disclosure.
Figure 5E:
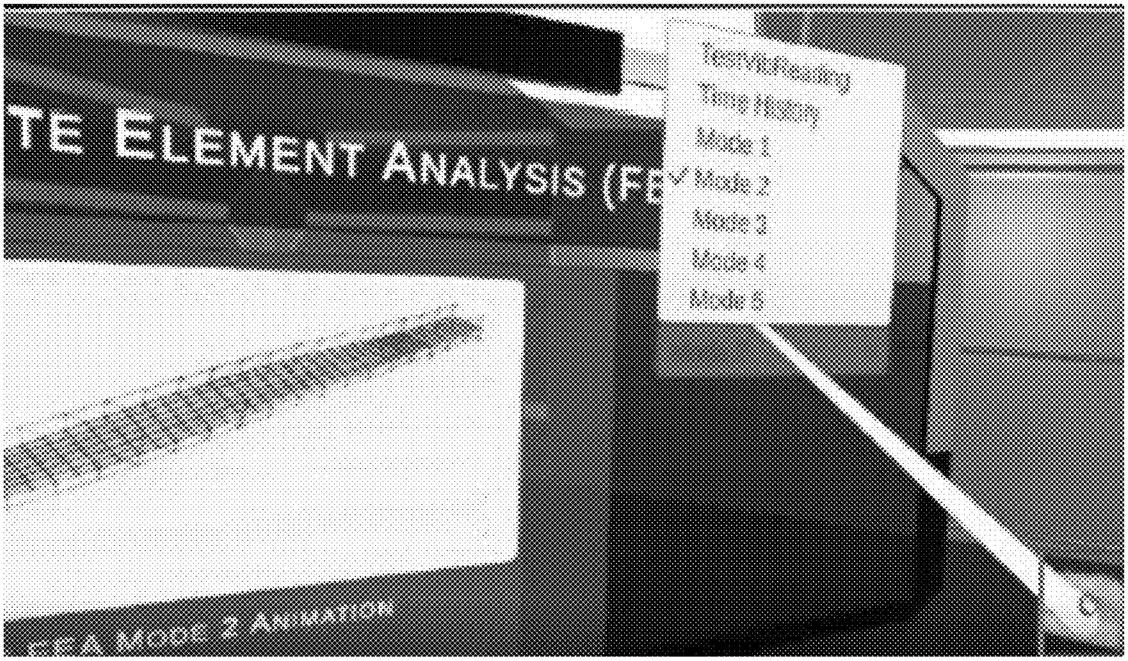
FIG. 5E is an FEA drop-down box of at least one visualization platform, according to an embodiment of the present disclosure.

After at least one of the plurality of model options has been selected by the at least one user, as shown in FIG. 5C, in an embodiment, the at least one processor may be configured to transmit at least one signal provided by the at least one user interface to the at least one visualization platform, such that the user may interact with the features of the at least one selected model (e.g., spatial model) and/or overlayed sensorial data within the collaborative space of the at least one visualization platform. In this embodiment, the design of the collaborative space within the at least one visualization platform may include at least two parts: (1) at least one panel; and (2) a virtual projector. As such, in section (1): the at least one panel, at least one aspect of the sensorial data (e.g., structural analysis-related data) which may include, but is not limited to Operational Modal Analysis (hereinafter "OMA"), a Finite Element Analysis (hereinafter "FEA"), and/or model differences between at least one model and at least one alternative model within the plurality of different model options may be shown. Additionally, as shown in FIG. 5C, in this embodiment, the at least one visualization platform may further comprise a dropdown box within the collaborative space, such that the at least one user may be able to switch to at least one of the following including but not limited to: the FEA and/or OMA result panels, at least one mode shape, at least one of a plurality of structural parameters, acceleration set-up plans, other sensorial data known in the art, and/or other computation results known in the art, as shown in FIG. 5C FIG. 5D, FIG. 5E, FIG. 5F, and FIG. 5G.

Figure 5F:
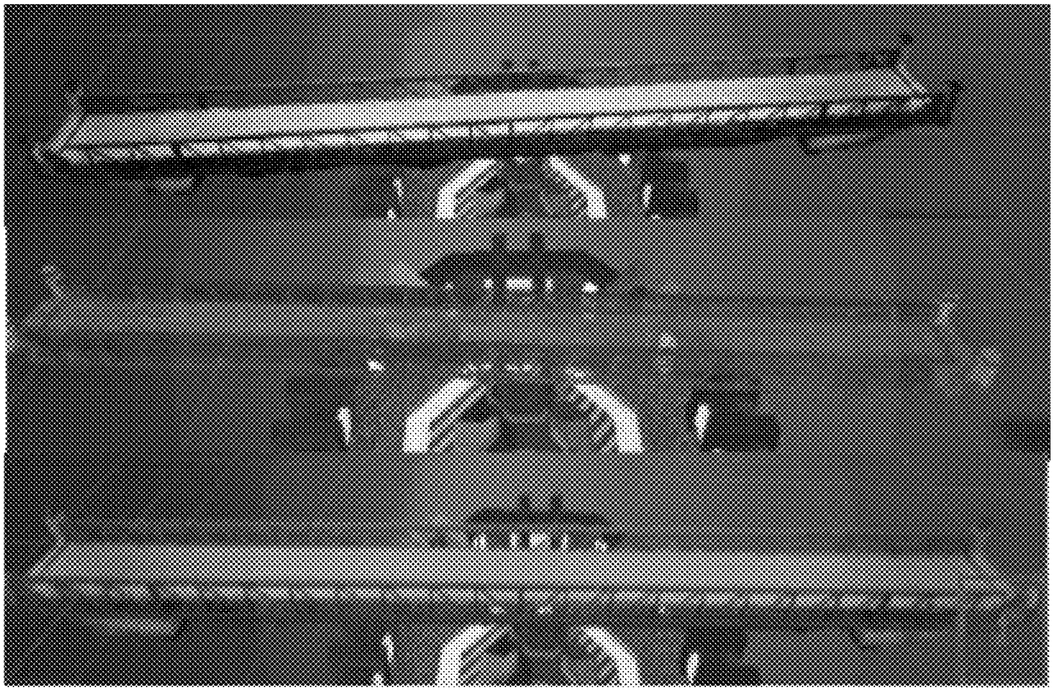
FIG. 5F depicts from top to bottom a UAV photogrammetry point could, a point could, and a UAV photogrammetry meshed model of at least one visualization platform, according to an embodiment of the present disclosure.

Moreover, in section (2); the virtual projector, as shown in FIG. 5F, in conjunction with FIG. 4, in an embodiment, as stated above, the at least one processor may be configured to transmit the at least one signal from the at least one user interface to the at least one visualization platform, such that the at least one user may be able to interact with the virtual project in order to alternate the at least one selected model option of the plurality of model options within virtual projector to see at least one of the following: at least one alternative spatial model of the at least one civil structure within the point cloud, UAV photogrammetry meshed model, and/or point cloud. Additionally, in this embodiment, the FEA may be reflected on the point cloud and/or the displacement values of each node from the FEA and/or spatial model may be inserted in the point cloud, providing better visualization of the dynamic response.

In this manner, as shown in FIG. 5F, in conjunction with FIG. 4, the sensorial data of a predetermined amount of time (i.e., the at least one sensorial input) (e.g., a time history analysis result) from the FEA may be reflected on the point cloud model where the at least one user may be able to experience the structural behavior of the structure with at least one-color code based on the real displacement of each joint for the data collection time window. Additionally, in this embodiment, the at least one visualization platform may comprise a dynamic node tracking panel within the collaborative space, such that the at least one visualization platform may be configured to display the behavior and/or movement of the at least one civil structure. In this manner, the at least one user may observe the behavior and/or the movement of the at least one civil structure, such that the at least one user may be able to monitor the displacement of at least one node on the at least one civil structure.

Figure 5G:
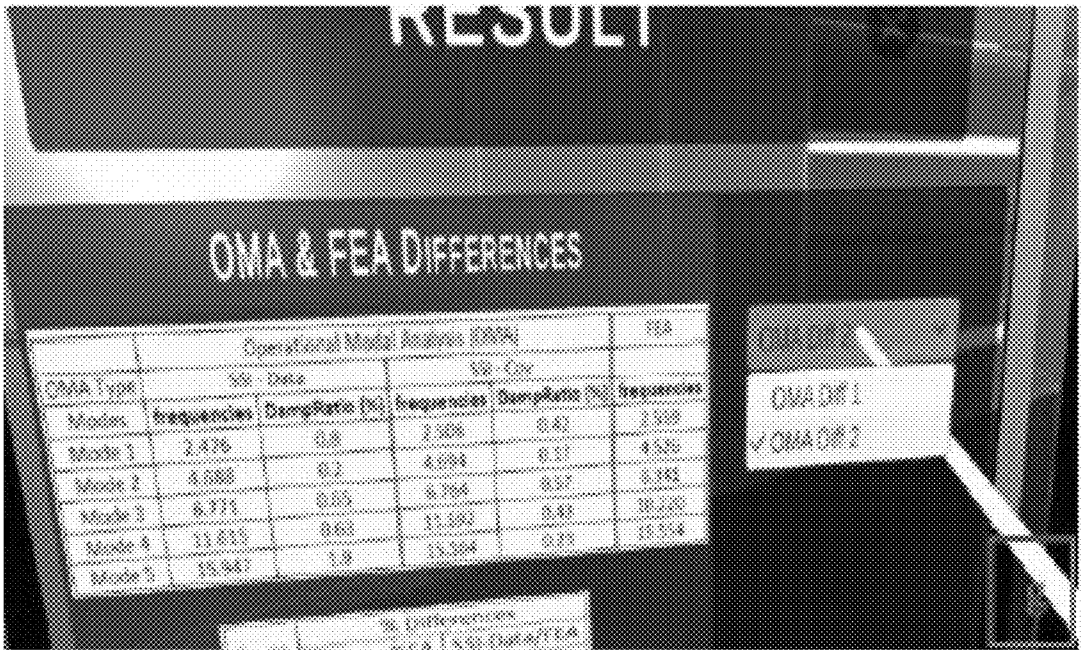
FIG. 5G is a result drop-down box of at least one visualization platform, according to an embodiment of the present disclosure.
Figure 5H:
FIG. 5H is an FEA reflected TLS point cloud in a project of at least one visualization platform, according to an embodiment of the present disclosure.

Furthermore, as shown in FIG. 5G and FIG. 5H, in conjunction with FIG. 4, in an embodiment, during the operational loading of the at least one civil structure, the at least one processor may be configured to transmit the at least one recorded sensorial input and/or at least one present sensorial input of the at least one civil structure to the at least one visualization platform in real-time. As such, in this embodiment, the at least one visualization platform may automatically display the displacement of each node dynamically over the recording duration and/or in real-time at least one user may be able to visualize the displacement of each node dynamically over the recording duration. As such, the at least one user may be able to visualize and detect critical serviceability criteria of structures.

Figure 6A:
FIG. 6A is an FEA reflected point cloud with serviceability limit state check warning and dynamic monitoring of the midspan of at least one visualization platform, according to an embodiment of the present disclosure.

For example, American Association of State Highway and Transportation Officials (hereinafter "AASHTO") may direct that for structures predominantly used for pedestrian travel, the maximum allowable displacement is at least L/1000 where L may comprise the clear span length for the structural serviceability limit state of deflection. As such, in this example, in some embodiments, in the dynamic node tracking panel within the collaborative space, if this value is exceeded, the dynamic node tracking panel may be configured to automatically provide the at least one user with at least one notification which may include a warning under the operational condition, as shown in FIG. 5H and FIG. 6A, in conjunction with FIG. 1 and FIG. 4. In these other embodiments, the structure analysis visualization system may be configured to provide the at least one notification to the at least one user auditorily, tactilely, and/or visually, via the at least one user interface.

Figure 6B:
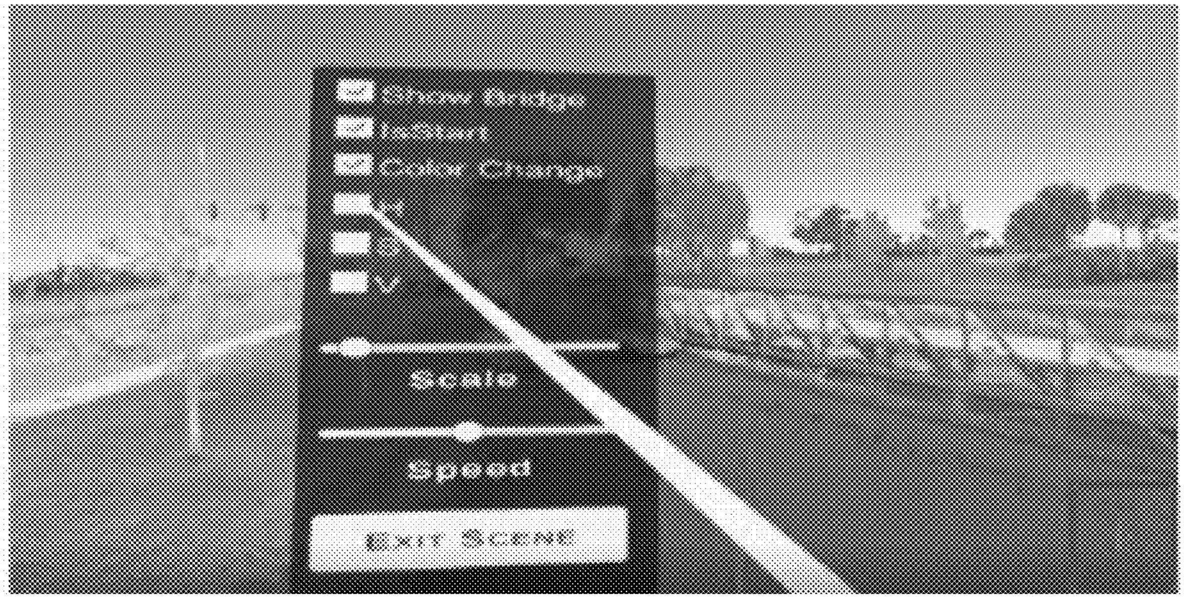
FIG. 6B is a configuration panel of the FEA reflected point cloud in an immersive view of at least one visualization platform, according to an embodiment of the present disclosure.
Figure 6C:
FIG. 6C is dynamic monitoring of all nodes of structures with a VR controller in an immersive view of at least one visualization platform, according to an embodiment of the present disclosure.

As shown in FIG. 6A and FIG. 6C, in conjunction with FIG. 4, in an embodiment, the at least one processor of the structure analysis visualization system may be configured to transmit the at least one sensor test setup to the at least one visualization platform, such that the at least one visualization platform may display and/or overlay the at least one sensor test setup up on the at least one spatial model in the collaborative space. As such, as shown in FIGS. 6A-6H, in conjunction with FIG. 4, in this embodiment, as stated above, the at least one spatial model displayed in the at least one visualization platform may be interactable with at least one user. In this manner, in some embodiments, the at least one user may grab, turn, and/or rotate on at least one axis (i.e., x-axis, y-axis, and/or z-axis), via the at least one user interface, such that the at least one user may be able to view the at least one spatial model of the at least one civil structure in at least one alternative angle.

Furthermore, as shown in FIG. 6B and FIG. 6C, in conjunction with FIG. 4, in an embodiment, the at least one processor may be configured to transmit a copy of the point cloud model with at least one color and at least one movement coded from FEA results to the virtual projector of the at least one visualization platform. In this embodiment, the point cloud model may contain the same color and/or the same movement of the at least one civil structure and/or the at least one alternative civil structure. Moreover, the at least one processor may be configured to display, via the at least one visualization platform, the results in at least one immersive view, such that the at least one user may transition between at least one immersive view and at least one alternative immersive view, via at least one view option button configured to be displayed within the collaborative space of the virtual projector.

Accordingly, the at least one user may experience the at least one civil structure's behavior in its real environment and/or in real-time. As such, as shown in FIG. 6B, in conjunction with FIG. 4, when the user interacts with view option button, the at least one processor may be configured to display, via the at least one visualization platform, the at least one spatial model in the at least one civil structure's real environment. As such, in this embodiment, at least one UAV photograph may be inputted by the at least one user into the structure analysis visualization system, via the at least one user interface, and/or the structure analysis visualization system may be configured to communicate with at least one third-party software (e.g., Google Images), via the at least one processor, such that at least one UAV photograph of the at least one civil structure may be inputted and/or recorded within the memory of the structure analysis visualization system.

In this manner, as shown in FIG. 6B, in conjunction with FIG. 4, the at least one processor of the structure analysis visualization system may be configured to create the real environment of the at least one civil structure by converting the at least one UAV photograph into at least one UAV photogrammetry point cloud, such that the at least one UAV photogrammetry point cloud may be integrated into the at least one spatial model as displayed within the at least one visualization platform. Additionally, in some embodiments, structure analysis visualization system may be configured to provide the at least one user with the scene of the at least one civil structure's real environment in real-time. As such, in some embodiments, in the at least one spatial model, the structure analysis visualization system may be configured to integrate both the FEA reflected point cloud and/or the UAV photogrammetry point could, such that the FEA reflected point cloud may be aligned with the UAV photogrammetry point cloud within the at least one visualization platform.

In this manner, the at least one user may be able to better conceptualize the at least one civil structure's structural dynamic behavior and/or movement (e.g., FEA reflected point cloud) under an operational loading as the at least one civil structure's response may deviate from its original stationary position (e.g., UAV photogrammetry point cloud form), optimizing the inspection of the integrity, behaviors and/or movements of the at least one civil structure. Accordingly, as shown in FIG. 6A, the visualization of the at least one civil structure's response (e.g., integrity, behavior, and/or movement), via the structure analysis visualization system, may provide an efficient way to compare at least one deflection of at least one of a plurality of members of the at least one civil structure, as compared to the standard in-person inspection, requiring expensive inspection equipment and machinery.

In addition, in an embodiment, the structure analysis visualization system may be configured to display, via the at least one processor, a vertical displacement of each one of a plurality of nodes in at least one alternative panel within the collaborative spa of the at least one visualization platform, when the at least one user highlights the at least one civil structure, via the at least one user interface. As such, as shown in FIG. 6B and FIG. 6C, in this embodiment, at least one configuration panel may be provided in the collaboration space, such that the at least one user may interact with the at least one configuration panel, via the at least one user interface, such that the at least one user may adjust the visualization of the at least one civil structure. The at least one configuration panel may include but is not limited to, a scale, a speed slider, a 3-axis displacement (H, S, V), and/or any option known in the art to provide adjusted visualization of the at least one civil structure. In some embodiments, when the at least one civil structure's behavior and/or movement scale and/or speed is be adjusted, the structure analysis visualization system may be configured to provide at least one additional option to the at least one user within the at least one visualization platform, via the at least one processor, to visualize different scales and/or speeds on 3-axis.

Figure 6D:
FIG. 6D is an exemplary configuration of at least one multi-user visualization platform, according to an embodiment of the present disclosure.
Figure 6E:
FIG. 6E is an alternative exemplary configuration of the at least one multi-user visualization platform of FIG. 6D, according to an embodiment of the present disclosure.

As shown in FIG. 6D and FIG. 6E, in an embodiment, the structure analysis visualization system may comprise a multiplayer network, such that at least one user and at least one alternative user may interact with the at least one spatial model within the collaborative space of the at least one visualization platform. In this manner, via the multiplayer network, the collaborative space of the at least one visualization platform may be in electrical and/or wireless communication and/or any communication known in the art (e.g., Bluetooth, Wi-Fi, and/or cloud computing) with at least one alterative visualization platform and/or at least one alternative user interface, allowing the at least one user and the at least one alternative user to join to collaborative space of the at least one visualization platform. In this embodiment, the at least one user and/or the at least one alternative user may be able to interact and/or communicate through tactile, visual, and/or auditory stimulus (e.g., voice chat, being able to choose avatars for the at least one user's virtual persona), in real-time.

In some embodiments, structure analysis visualization system may be configured to allow at least 20 users to communicate and/or interact within the collaborative space, via the multiplayer network. Accordingly, project efficiency may be optimized by allowing teams of at least one user to interact, communicate and/or work on the same project with at least another alternative user within the same collaborative space. In some embodiments, multiple teams may be able to interact within the same multiplayer network and/or work on the same project.

Figure 6F:
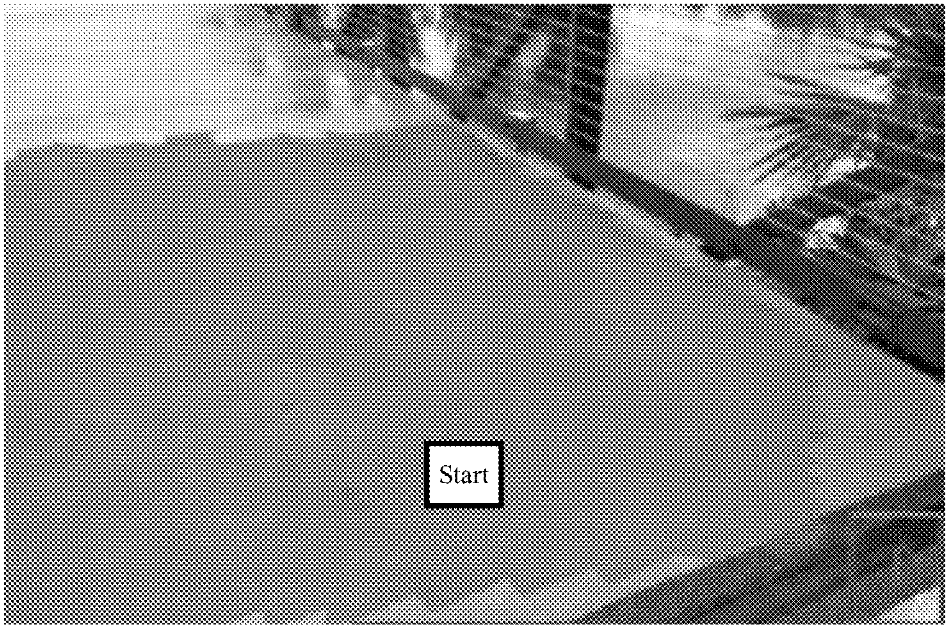
FIG. 6F is an exemplary configuration of real-time scanning of a structure using a LiDAR equipped computing device of at least one visualization platform, according to an embodiment of the present disclosure.
Figure 6G:
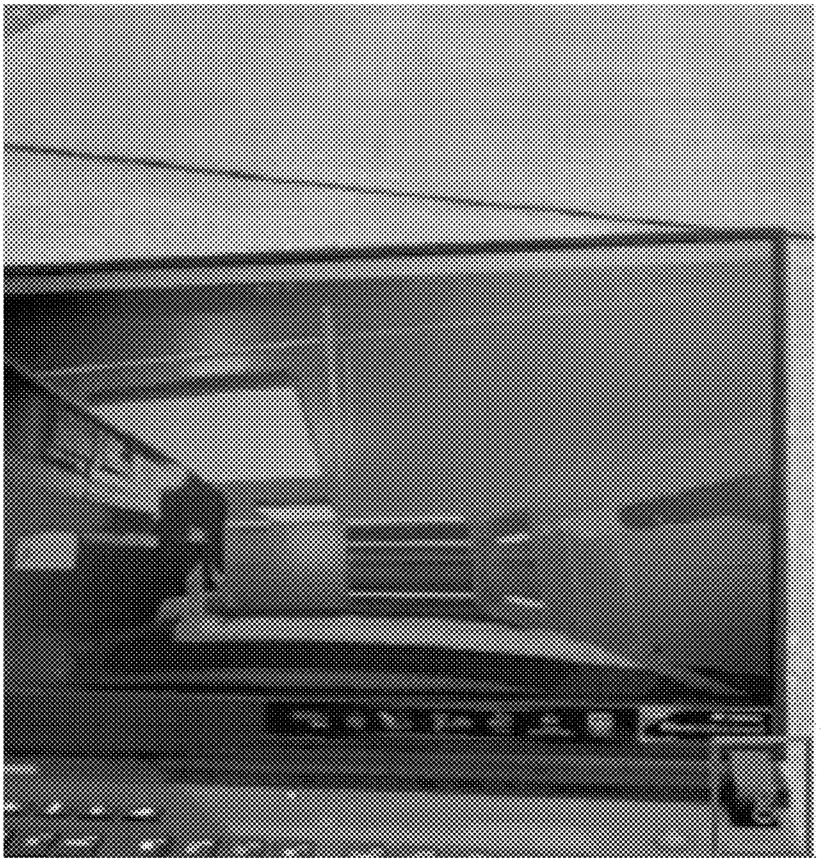
FIG. 6G is an exemplary configuration of a civil structure reconstruction in at least one visualization platform, according to an embodiment of the present disclosure.
Figure 6H:
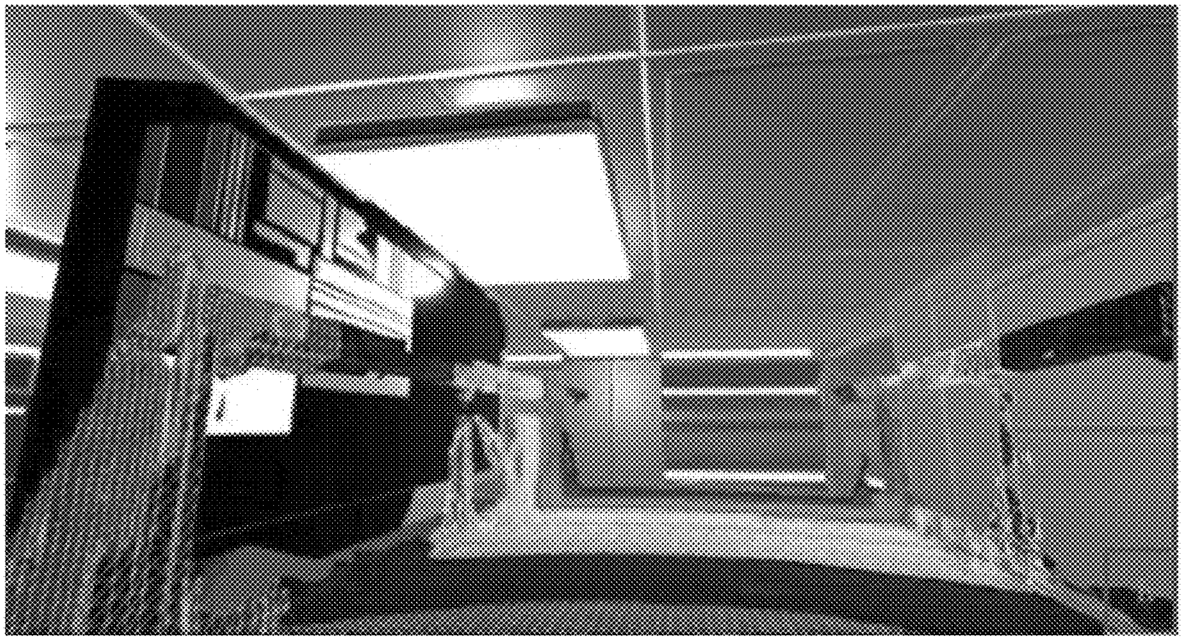
FIG. 6H is an alternative exemplary configuration of a real-time 3D reconstruction of a structure using a LiDAR equipped computing device in at least one visualization platform, according to an embodiment of the present disclosure.

Furthermore, in an embodiment, as shown in FIG. 6F, FIG. 6G, and FIG. 6H, in conjunction with FIG. 1 and FIG. 4, the structure analysis visualization system may comprise a LiDAR scanning method, such that the LiDAR scanning method may be integrated within the at least one visualization platform, via the at least one processor. Additionally, in this embodiment, the structure analysis visualization system may be configured to be in electrical and/or wireless communication with at least one LiDAR sensor and/or application via at least one third-party, such that they may be able to be used on the same network and/or device. Accordingly, in this embodiment, as shown in FIG. 6F, the at least one processor may be configured to transmit a real-time 3D scan of the at least one civil structure, such that the real-time 3D scan may be displayed within the at least one visualization platform by the at least one user.

As shown in FIGS. 6G-6H, in some embodiments, while at least one alternative user and/or the structure analysis visualization system may be presently scanning the structure using an iPad and/or any camera known in the equipped with LiDAR, the structure analysis visualization system may be configured to automatically transmit the LiDAR scan to the at least one visualization platform, such that the at least one user interacting with the at least one visualization platform may be able to see the reconstructed version of the at least one scanned civil structure (e.g., the spatial model), in real-time. For example, as shown in FIG. 6F, in some embodiments, the structure analysis visualization system may provide a step-by-step reconstruction of the at least one civil structure as the at least one civil structure is scanned in real-time. In addition, in some embodiments, structure analysis visualization system may be configured to dispose the at least one user within the waiting room of the at least one visualization platform until the reconstructed version of the at least one scanned civil structure is completed and/or loaded.

Additionally, as shown in FIG. 6G and FIG. 6H, in some embodiments, the structure analysis visualization system may be configured to display a video and/or photograph of the real-time scanning of the at least one civil structure within the at least one visualization platform as the at least one civil structure is being scanned. Moreover, in some embodiments, the structure analysis visualization system may be configured to transmit the real-time video and/or photograph of the scanning of the at least one civil structure into a memory of the computing device, via the at least one processor, such that the at least one user may access the video and/or photograph on request.

As such, the present disclosure provides a system and method for providing a condition assessment framework for at least one civil structure, such that structural inspection and/or maintenance of the at least one civil structure may be optimized. Accordingly, in an embodiment, the at least one user may be able to collaborate from their offices by connecting at least one user interface into at least one visualization platform during a periodic structural condition assessment, significantly minimizing and/or completely eliminating site visits to the structure. By doing this, the productivity of the at least one user may be substantially increased, while also improving the safety of structures, by providing real-time data of the structure, via the at least one sensor and/or sensorial system.

The following examples are provided for the purpose of exemplification and are not intended to be limiting.

EXAMPLES

Example 1

Structural Health Monitoring of a Foot Bridge in a Virtual Reality Environment

Introduction

Civil infrastructure systems age and deteriorate over time while also experiencing extreme events such as hurricanes and earthquakes. Aging effects become more evident over time especially in developed countries such as the US that built its infrastructure systems many decades ago. According to the American Society of Civil Engineers (ASCE) Infrastructure Report Card, 42% of the 617,000 bridges are more than 50 years old and more than 46,000 of them are structurally deficient (ASCE 2021). This means that more than 46,000 bridges need imminent attention. In the report, the bridges are evaluated as letter grade "C" ("A" being the best "F" being the lowest score), dams are rated as "D", roads are "D" transit systems "D-", wastewater systems "D+". Poor infrastructure systems can cause catastrophic effects on a nation's economy and may even lead to loss of life.

According to the Manual for Bridge Evaluation from the American Association of State Highway and Transportation Officials (hereinafter "AASHTO") (AASHTO, 2018), the inspection types are classified into seven: Initial Inspection, Routine Inspection, In-Depth Inspection, Fracture Critical Member Inspection, Underwater Inspection, Special Inspection, Damage Inspection. Each type of inspection has its minimum time intervals required by the National Bridge Inventory Standards (NBIS) depending on the requirements and condition of the structure. Conducting these required periodic inspections is not a trivial task. There are several challenges for bridge inspections such as traffic closures, an inspection of inaccessible areas, high costs resulting from timely operations, and usage of expensive special equipment or heavy machinery or safety gears. To better understand the structure, site visits by bridge owners, engineers, and inspectors may be needed during the inspection or Structural Health Monitoring (SHM) applications.

Seeing the structure first-hand assists to conceptualize the inspection, SHM, or even rehabilitation plans. However, conducting field trips may take time and be costly. In addition, site visits may pose danger and require personal protective equipment (PPE). In certain cases, experienced engineers who cannot be present at the site visits may only look at photos, videos, reports separately without having the freedom to do their field inspection. That is why it is critical to explore the applicability of new technological mediums, such as visualization platforms to create virtual site visits in which the range of team members required to perform the required SHM inspections can visit and explore the bridge with the data at their fingertips as if they were physically there.

Objective

To access a structure, to integrate necessary information, and to mitigate time, cost, and work zone safety issues, a virtual reality and/or augmented reality environment (i.e., a visualization platform) can be developed to address these limitations. A visualization platform of a steel truss footbridge located on the campus of the University of Central Florida is developed to demonstrate the integration of novel technologies to address the issues listed above. By taking advantage of sophisticated computer graphics and computer vision technology, the presented visualization platform aimed to create an interactive space that integrates the bridge and its surrounding environment along with Structural Health Monitoring (SHM) data and Finite Element Analysis (FEA) of the bridge to support decision making.

As such, a framework of a visualization platform of a footbridge that integrates Finite Element Analysis (FEA) and Operational Modal Analysis (OMA) to be utilized by users for decision making. Accordingly, the following description can be summarized as follows: (1) Investigation of FEA and OMA of an existing structure in the visualization platform; (2) Reflection of the FE analysis results on the LiDAR point cloud; (3) UAV photogrammetry, Terrestrial and iPad LiDAR captures of the real asset in the same model; and (4) Multi-user communication capability in the visualization platform. As such, the visualization platform model includes the real captures of the footbridge with UAV photogrammetry and terrestrial LiDAR which provides the point cloud and meshed models with post-processing. With the display of the FEA and OMA results in the model, the user can track the movements of the bridge under its operational loading node by node while conducting visual inspection either in the 2D panel or 3D structure or in a more immersive 3D version in its full environment. For the visualization platform development, Unity software and Oculus Quest 2 head-mounted display is used.

Since details of the structural analysis methods are not in the scope of this paper, the FEA and OMA processes are explained briefly. A 10-channel dynamic analyzer is used to collect the acceleration data on a steel-truss footbridge under an operational pedestrian loading for 112 seconds. The vibration data is further processed using Stochastic Subspace Identification Data and Covariance methods in MATLAB® to extract the modal parameters for the OMA. Also, the same recorded vibration data was inputted in the SAP2000® FEA software to conduct time history analysis. Finally, the modal parameters are compared from both OMA and FEA of the structure to investigate the expected design (from FEA) and actual behavior (from OMA), thus damage diagnostics could be implemented. The results are displayed in the visualization platform, which is explained in the following sections.

Real-Asset Capturing Methods and Considerations

Both photogrammetry and LiDAR captures have advantages to each other in terms of quality, processing speed, and accuracy. To provide various options to the user, both terrestrial and iPad LiDAR, and UAV photogrammetry are used to capture the footbridge. The terrestrial LiDAR (TLS) inputs are further processed and down sampled in Cloud Compare open-source program to reduce the file size since it slows down the usage of the visualization platform model. The point cloud model is then processed in the visualization platform model. Also, by using a UAV, approximately 1400 aerial pictures of the footbridge are processed in the Reality Capture® software to down sample and create point cloud models of the structure. The point cloud then meshed and textured to create the 3D meshed model.

During the capturing process of the footbridge with UAV, there were few challenges including not having access to both ends of the bridge and underside (lateral truss system) because of the tree coverage and very low clearance distance (few feet) between the water surface to the bridge. A smaller UAV or a boat can be employed in such cases. In addition, iPad LiDAR capturing method is used to scan the accessible parts of the footbridge. With the help of the AR foundation package, the real-time scan with the iPad of the footbridge can be seen in the visualization platform. Yet, the iPad's LiDAR technical capabilities, while very low cost and easy to use, are very limited and are not recommended for large and critical structure scans where details are needed. However, it is very useful for preliminary scans or for an average visual accuracy of small-scaled areas such as scanning a 2-sqft spalled section in the girder for inspection purposes.

Visualization Platform Development

The visualization platform is designed in a way that is easy to navigate, easy to visualize the needed materials, and organized environment to provide a good quality workplace for engineers, inspectors, clients, and contractors. Then, once the user enters into the first play scene, the user comes across a panel that provides options to choose an avatar before entering the room that will be his visualization platform persona in the collaborative space as shown in FIG. 5A. Then, the user comes across a console that provides different model options (real asset captures) to be chosen which will be viewed in the room. These options can be switched to other models later in the main console in the room, as shown in FIG. 5B. After that, the user can start interacting with the features that the visualization platform room has to offer. The setup view of the room can be seen in FIG. 5C. The design of the room has two main parts: Panels and a virtual projector. In the panels part, all the structural analysis-related information including OMA, FEA, and model differences result are shown. With a drop-down box, the user can switch to any one of the following: the FEA and OMA result panels, mode shapes, structural parameters, acceleration set up plans, and other computation results, as shown in FIGS. 5C-G. Secondly, in the projector part, the user can interact with the projector and switch to see different 3D bridge models in TLS point cloud, UAV photogrammetry meshed model, or point cloud, as shown in FIG. 5F. Also, the FE analysis that is reflected on the TLS point cloud and the displacement values of each node in the FEA model are inserted in the point cloud, providing better visualization of the dynamic response.

In other words, the time history analysis result from FEA is reflected on this point cloud model where users can experience the structural behavior of the bridge with different color codes based on the real displacement of each joint for the data collection time window of 112 seconds. This can be observed with the dynamic node tracking panel where the user can monitor the displacement of the nodes on the mid-span. Here, during the operational loading of the structure, the user can see the displacement of each node dynamically over the recording duration. This is a very important feature for service ability criteria of bridges. AASHTO directs that for bridges with pedestrians, the maximum allowable displacement is L/1000 where L is the clear span length for the structural serviceability limit state of deflection. Thus, the maximum allowable displacement is 0.128 in. In the dynamic node tracking panel, if this value is exceeded, the panel gives a warning under the operational condition, as shown in FIG. 5H and FIG. 6A. The vertical displacement from the time history FEA result is significantly lower than 0.128 in. In order to test the serviceability detection algorithm, the displacements of few nodes in the midspan are increased. Additionally, the sensor test setup can be displayed from the projector on the bridge. The 3D models in the visualization platform are grab-interactable as users can grab, turn, and rotate in different axis to be able to view the structure with better angles in various types of models.

Furthermore, the projector contains a copy of the TLS point cloud model with the same color and movement coded from FE analysis results. These results can be seen in the immersive view options button in the projector in case the user wants to experience the structure's behavior in its real environment. Once the user interacts with that button, the model takes the user to the scene of the footbridge real environment obtained using the UAV photogrammetry point cloud form. In this scene, the FEA reflected on the TLS point cloud is aligned with the UAV photogrammetry point cloud. The user can better conceptualize bridge structural behavior (FEA reflected on TLS point cloud) under the operational loading as the structural response deviates from its original stationary position (UAV photogrammetry point cloud form). Visualization of the structural response is a very efficient way to compare the deflections of each member.

In addition, the vertical displacement of each node can be seen in a separate panel via the user's visualization platform controller arrays once they are pointed at the bridge. Also, a configuration panel accompanies the user and provides scale, speed slider, and 3-axis displacement (H, S, V) options where the bridge's movement scale and speed can be adjusted to visualize different scales and speeds in 3-axis as needed. These features can be seen in FIGS. 6B-6C. Moreover, the multi-user feature is applied by using the Photon networking engine and multiplayer platform. By using the network, up to 20 people can join the visualization platform and they can interact and communicate through voice chat and choose avatars for the user's virtual persona. With this feature, teams can work on the same project efficiently, as shown in FIGS. 6D-6E.

In addition, the vertical displacement of each node can be seen in a separate panel via the user's visualization platform controller arrays once they are pointed at the bridge. Also, a configuration panel accompanies the user and provides scale, speed slider, and 3-axis displacement (H, S, V) options where the bridge's movement scale and speed can be adjusted to visualize different scales and speeds in 3-axis as needed. These features can be seen in FIGS. 6B-6C. Moreover, the multi-user feature is applied by using the Photon networking engine and multiplayer platform. By using the network, up to 20 people can join the visualization platform and they can interact and communicate through voice chat and choose avatars for the user's virtual persona. With this feature, teams can work on the same project efficiently, as shown in FIGS. 6D-6E.

Lastly, another LiDAR scanning method is utilized in the visualization platform. In recent years, Apple products have started to get LiDAR sensors and via third-party application, they can be used on the Apple device. Using the AR foundation package in Unity software, the real-time 3D scan of the structure can be viewed in the visualization platform by the user. In other words, while another person is scanning the structure, the visualization platform user can see it in the visualization platform. FIG. 6F depicts the iPad screen while it is scanning the footbridge. FIGS. 6G-6H shows the real-time scanning of the structure in the visualization platform model. It is concluded that the capability of LiDAR sensor in Apple devices has very limited capability for large-sized objects especially a structure for structures such as the footbridge.

Conclusion

The minimized field visits enables interaction and communication in this visualization platform for decision making by reducing the cost, minimizing work zone hazards. The teams can work in the visualization platform by connecting to Photon servers from their offices.

Accordingly, in summary, the operational modal analysis (OMA) results from dynamic response monitoring as well as the finite element analysis (FEA) are displayed in the visualization platform model. Additionally, the point cloud and meshed model of the footbridge are formed from UAV photogrammetry and TLS LiDAR, such that the models displayed in the visualization platform model provide the visualization of the real asset.

Moreover, the structural displacements are extracted from FEA with a time history and then the structural behavior of the footbridge is reflected on the TLS LiDAR point cloud model of the bridge with dynamically changing color codes. Thus, the user can experience the structural behavior of the footbridge in an immersive way.

Furthermore, the visualization platform comprises a dynamic Node Tracking feature, such that when it is implemented it helps monitor the serviceability limit state of deflection of the footbridge in the immersive environment. In addition, by using the Photon networking engine and multiplayer platform, a multi-user feature is added in the visualization platform model to provide visual and auditory communication.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

INCORPORATION BY REFERENCE

Application of Virtual Reality Technique in the Construction of Modular Teaching Resources International Journal of Emerging Technologies in Learning (iJET), 15 (10) (2020), pp. 126-139 Kassel, Germany: International Journal of Emerging Technology in Learning.

Khaloo, A., Lattanzi, D., Jachimowicz, A., & Devaney, C. (1AD, January 1). Utilizing UAV and 3D computer vision for visual inspection of a large gravity dam. Frontiers. Retrieved Mar. 24, 2022, from https://doi.org/10.3389/fbuil.2018.00031.

Rehm, K. C. P. E., 2013. Bridge Inspection: Primary Element Bridge Inspection Continues to Evolve in U.S. Retrieved from https://www.roadsbridges.com/bridge-inspection-primary-element.

Omer et al., 2019. Omer M., Margetts L., Mosleh M. H., Hewitt S., Parwaiz M. Use of Gaming Technology to Bring Bridge Inspection to the Office Structure and Infrastructure Engineering, 15 (10) (2019), pp. 1292-1307 Doi:10.1080/15732479.2019.1615962.

Omer et al., 2018. Omer M., Hewitt S., Mosleh M. H., Margetts L., Parwaiz M., 2018. Performance Evaluation of Bridges Using Virtual Reality. Presented at 6th European Conference on Computational Mechanics 7th European Conference on Computational Fluid Dynamics, Glasgow, United Kingdom.

Omer et al., 2021. Omer M., Margetts L., Mosleh M. H., Cunningham L. S. Inspection of Concrete Bridge Structures: Case Study Comparing Conventional Techniques with a Virtual Reality Approach Journal of Bridge Engineering Vol. 26 Iss., 10 (2021) October 2021.

Fogarty et al., 2015. Fogarty J., El-Tawil S., McCormick J., 2015. Exploring Structural Behavior and Component Detailing in Virtual Reality. Presented at: ASCE Structures Congress 2015.

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

It is also to be understood that the following claims are intended to cover all of the generic and specific features of the invention herein described, and all statements of the scope of the invention which, as a matter of language, might be said to fall therebetween.

What is claimed is:

1. A method of contactless structural analysis on at least one visualization platform associated with a computing device, the method comprising the steps of:

receiving, via at least one user interface associated with the at least one visualization platform, a data query from at least one user regarding at least one civil structure;

transmitting, via at least one processor of the computing device communicatively coupled to at least one sensor in mechanical communication with the at least one civil structure, at least one sensorial input to the at least one visualization platform, the at least one sensorial input being configured to be displayed on the at least one visualization platform;

receiving the at least one sensorial input at the at least one visualization platform;

obtaining time-varying displacement values associated with a plurality of structural locations of the at least one civil structure, the time-varying displacement values being obtained from a measured structural response based on the at least one sensorial input, finite element analysis (FEA) time-history results generated based on the at least one sensorial input, precomputed FEA time-history results, or a combination thereof;

generating, via the at least one visualization platform, at least one spatial model of the at least one civil structure based on the at least one received sensorial input;

spatially associating, via the at least one processor, the plurality of structural locations with corresponding portions of the at least one generated spatial model;

overlaying, via the at least one processor, the time-varying displacement values onto the corresponding portions of the at least one generated spatial model;

dynamically changing, via the at least one processor, spatial positions of the corresponding portions of the at least one generated spatial model through time according to the time-varying displacement values associated with the corresponding portions of the at least one generated spatial model, thereby visualizing movement of the at least one civil structure; and automatically displaying the at least one generated spatial model on the at least one visualization platform associated with the computing device by:

based on a determination that at least one tactile-input is received from the at least one user, via the at least one user-interface, generating at least one spatial alteration to the at least one generated spatial model, the at least one spatial alteration comprising displaying at least one time-varying displacement value of the time-varying displacement values associated with at least one portion of the at least one generated spatial model selected by the at least one tactile-input; and based on a determination that at least one tactile-input is not received from the at least one user, via the at least one user-interface, maintaining display of the dynamically changing generated spatial model without generating the at least one spatial alteration based on the at least one tactile-input.

2. The method of claim 1, wherein the at least one sensor is selected from a group consisting of an accelerometer, a strain gauge, a potentiometer, a camera, a UAV, a LiDAR scanner, an NDT tool, an ultrasound system, an infrared camera, Ground Penetrating Radar (GPR), and a combination thereof.

3. The method of claim 1, wherein the at least one visualization platform associated with the computing device comprises a multiplayer network, thereby allowing the at least one user and at least one alternative user to engage with the at least one generated spatial model simultaneously.

4. The method of claim 1, wherein obtaining the time-varying displacement values associated with the plurality of structural locations of the at least one civil structure comprises obtaining first time-varying displacement values from the at least one sensorial input and obtaining second time-varying displacement values from FEA time-history results generated based on the at least one sensorial input, and wherein the first time-varying displacement values and the second time-varying displacement values are spatially associated with corresponding portions of the at least one generated spatial model and dynamically reflected on the corresponding portions of the at least one generated spatial model through time.

5. The method of claim 3, further comprising:

recording, via the at least one processor of the computing device, the at least one sensorial input to a memory of the computing device; and assigning, via the at least one processor, a unique profile to the at least one recorded sensorial input, the at least one generated spatial model, or both associated with the at least one civil structure.

6. The method of claim 5, further comprising the step of, after assigning the unique profile:

recording at least one sensorial input from at least one alternative civil structure to the memory of the computing device; and generating at least one alternative spatial model of the at least one alternative civil structure.

7. The method of claim 6, further comprising the step of, after recording the at least one sensorial input of the at least one alternative civil structure, assigning, via the at least one processor, an alternative unique profile to the at least one recorded sensorial input from the at least one alternative civil structure, the at least one generated alternative spatial model, or both associated with the at least one alternative civil structure.

8. The method of claim 7, further comprising the step of, receiving, via the at least one user-interface, a spatial model query regarding the unique profile, the alternative unique profile, or both from the at least one user, the at least one alternative user, or both, wherein upon receiving the spatial model query, the at least one processor is configured to automatically display the at least one spatial model, the at least one alternative spatial model, or both on the at least one visualization platform associated with the computing device.

9. The method of claim 1, further comprising the step of, after generating the at least one spatial model, dynamically changing a color of the corresponding portions of the at least one generated spatial model through time according to the time-varying displacement values associated with the corresponding portions of the at least one generated spatial model.

10. The method of claim 9, further comprising the step of selecting, via the at least one user-interface, at least one portion of the at least one generated spatial model, wherein upon receiving the selection, the at least one processor is configured to automatically display a time-history analysis result, a displacement value, or node-tracking data associated with the selected portion of the at least one generated spatial model on the at least one visualization platform associated with the computing device.

11. The method of claim 1, further comprising the step of, after overlaying, via the at least one processor, the time-varying displacement values onto the corresponding portions of the at least one generated spatial model, displaying the at least one generated spatial model within a background scene comprising a real environment of the at least one civil structure.

12. A structural analysis optimization system for automatically displaying a spatial model of at least one civil structure on at least one visualization platform associated with a computing device, the structural analysis optimization system comprising:

the computing device comprising at least one processor; and a non-transitory computer-readable medium operably coupled to the at least one processor, the computer-readable medium having computer-readable instructions stored thereon that, when executed by the at least one processor, cause the structural analysis optimization system to automatically display at least one spatial model of the at least one civil structure on the at least one visualization platform associated with the computing device by executing instructions comprising:

receiving, via at least one user interface associated with the at least one visualization platform, a data query from at least one user regarding at least one civil structure;

transmitting, via at least one processor of the computing device communicatively coupled to at least one sensor in mechanical communication with the at least one civil structure, at least one sensorial input to the at least one visualization platform, the at least one sensorial input being configured to be displayed on the at least one visualization platform;

receiving the at least one sensorial input at the at least one visualization platform;

obtaining time-varying displacement values associated with a plurality of structural locations of the at least one civil structure, the time-varying displacement values being obtained from a measured structural response based on the at least one sensorial input, finite element analysis (FEA) time-history results generated based on the at least one sensorial input, precomputed FEA time-history results, or a combination thereof;

generating, via the at least one visualization platform, at least one spatial model of the at least one civil structure based on the at least one received sensorial input;

spatially associating, via the at least one processor, the plurality of structural locations with corresponding portions of the at least one generated spatial model;

overlaying, via the at least one processor, the time-varying displacement values onto the corresponding portions of the at least one generated spatial model;

dynamically changing, via the at least one processor, spatial positions of the corresponding portions of the at least one generated spatial model through time according to the time-varying displacement values associated with the corresponding portions of the at least one generated spatial model, thereby visualizing movement of the at least one civil structure; and automatically displaying the at least one generated spatial model on the at least one visualization platform associated with the computing device by:

based on a determination that at least one tactile-input is received from the at least one user, via the at least one user-interface, generating at least one spatial alteration to the at least one generated spatial model, the at least one spatial alteration comprising displaying at least one time-varying displacement value of the time-varying displacement values associated with at least one portion of the at least one generated spatial model selected by the at least one tactile-input; and based on a determination that at least one tactile-input is not received from the at least one user, via the at least one user-interface, maintaining display of the dynamically changing generated spatial model without generating the at least one spatial alteration based on the at least one tactile-input.

13. The structural analysis optimization system of claim 12, wherein the at least one sensor is selected from a group consisting of an accelerometer, a strain gauge, a potentiometer, a camera, a UAV, a LiDAR scanner, an NDT tool, an ultrasound system, an infrared camera, Ground Penetrating Radar (GPR), and a combination thereof.

14. The structural analysis optimization system of claim 12, wherein the at least one visualization platform associated with the computing device comprises a multiplayer network, thereby allowing the at least one user and at least one alternative user to engage with the at least one generated spatial model simultaneously.

15. The structural analysis optimization system of claim 14, wherein the executed instructions further comprise recording, via the at least one processor of the computing device, the at least one sensorial input to a memory of the computing device.

16. The structural analysis optimization system of claim 15, wherein the executed instructions further comprise, after recording the at least one sensorial input, assigning, via the at least one processor, a unique profile to the at least one recorded sensorial input, the at least one generated spatial model, or both associated with the at least one civil structure.

17. The structural analysis optimization system of claim 16, wherein the executed instructions further comprise, after assigning the unique profile:

recording at least one sensorial input from at least one alternative civil structure to the memory of the computing device; and generating at least one alternative spatial model of the at least one alternative civil structure.

18. The structural analysis optimization system of claim 17, wherein the executed instructions further comprise, after recording the at least one sensorial input of the at least one alternative civil structure, assigning, via the at least one processor, an alternative unique profile to the at least one recorded sensorial input from the at least one alternative civil structure, the at least one generated alternative spatial model, or both associated with the at least one alternative civil structure.

19. The structural analysis optimization system of claim 18, wherein the executed instructions further comprise, receiving, via the at least one user-interface, a spatial model query regarding the unique profile, the alternative unique profile, or both from the at least one user, the at least one alternative user, or both, wherein upon receiving the spatial model query, the at least one processor is configured to automatically display the at least one spatial model, the at least one alternative spatial model, or both on the at least one visualization platform associated with the computing device.

20. A method of contactless structural analysis on at least one visualization platform associated with a computing device, the method comprising the steps of:

receiving, via at least one user interface associated with the at least one visualization platform, a data query from at least one user regarding at least one civil structure;

transmitting, via at least one processor of the computing device communicatively coupled to at least one sensor in mechanical communication with the at least one civil structure, at least one sensorial input to the at least one visualization platform, the at least one sensorial input being configured to be displayed on the at least one visualization platform;

receiving the at least one sensorial input at the at least one visualization platform;

obtaining time-varying displacement values associated with a plurality of structural locations of the at least one civil structure, the time-varying displacement values being obtained from a measured structural response based on the at least one sensorial input, finite element analysis (FEA) time-history results generated based on the at least one sensorial input, precomputed FEA time-history results, or a combination thereof;

generating, via the at least one visualization platform, at least one spatial model of the at least one civil structure based on the at least one received sensorial input;

spatially associating, via the at least one processor, the plurality of structural locations with corresponding portions of the at least one generated spatial model;

overlaying, via the at least one processor, the time-varying displacement values onto the corresponding portions of the at least one generated spatial model;

dynamically changing, via the at least one processor, spatial positions of the corresponding portions of the at least one generated spatial model through time according to the time-varying displacement values associated with the corresponding portions of the at least one generated spatial model, thereby visualizing movement of the at least one civil structure;

creating, via the at least one visualization platform, a background scene comprising a real environment of the at least one civil structure; and automatically displaying the at least one generated spatial model within the background scene on the at least one visualization platform associated with the computing device by:

based on a determination that at least one tactile-input is received from the at least one user, via the at least one user-interface, generating at least one spatial alteration to the at least one generated spatial model, the at least one spatial alteration comprising displaying at least one time-varying displacement value of the time-varying displacement values associated with at least one portion of the at least one generated spatial model selected by the at least one tactile-input; and based on a determination that at least one tactile-input is not received from the at least one user, via the at least one user-interface, maintaining display of the dynamically changing generated spatial model without generating the at least one spatial alteration based on the at least one tactile-input.

* * * * *